(12) United States Patent
Futa et al.

(10) Patent No.: US 7,233,662 B2
(45) Date of Patent: Jun. 19, 2007

(54) NUMERICAL ARRAY OUTPUT DEVICE, A NUMERICAL ARRAY OUTPUT METHOD, AN ENCRYPTION DEVICE, AND A DECRYPTION DEVICE

(75) Inventors: Yuichi Futa, Osaka (JP); Motoji Ohmori, Hirakata (JP); Kaoru Yokota, Ashiya (JP); Makoto Tatebayashi, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 925 days.

(21) Appl. No.: 10/270,596

(22) Filed: Oct. 16, 2002

(65) Prior Publication Data

US 2003/0081770 A1 May 1, 2003

(30) Foreign Application Priority Data

Oct. 19, 2001 (JP) .............................. 2001-321651

(51) Int. Cl.
| | |
|---|---|
| H04K 1/00 | (2006.01) |
| H04L 9/00 | (2006.01) |
| G06F 7/04 | (2006.01) |
| G09C 5/00 | (2006.01) |
| H04L 9/30 | (2006.01) |
| H04B 1/00 | (2006.01) |

(52) U.S. Cl. .......................... 380/28; 380/30; 380/277; 726/5
(58) Field of Classification Search .................. 380/28, 380/30, 277; 726/5
See application file for complete search history.

(56) References Cited

U.S. PATENT DOCUMENTS 5,142,579 A    8/1992   Anderson 6,081,597 A  *  6/2000   Hoffstein et al. ............. 380/28

FOREIGN PATENT DOCUMENTS

| WO | 00/79692 | 12/2000 |
|----|----------|---------|
| WO | 01/93495 | 12/2001 |

OTHER PUBLICATIONS

Jeffrey Hoffstein et al., entitled "*NTRU: A Ring-Based Public Key Cryptosystem*", 1998, pp. 267-288.
Matsumoto, Tsutomu et al., entitled "*Public Quadratic Polynomial-Tuples for Efficient Signature-Verification and Message-Encryption*", Advances in Cryptology—E Eurocrypt. International Conference on the Theory and Application of Cryptographic Techniques, Springler Verlag, DE, 1988, pp. 419-453, XP000568374.

* cited by examiner

*Primary Examiner*—Emmanuel L. Moise
*Assistant Examiner*—Courtney D. Fields
(74) *Attorney, Agent, or Firm*—Wenderoth, Lind & Ponack, L.L.P.

(57) ABSTRACT

An encryption device encrypts a message, and includes a function value output unit that calculates a function value of the message using a one-way converting function. The encryption device also includes a numerical array output unit having an initial array decision unit that generates an initial decision array V1 having n1 elements of 1, n2 elements of −1, and (n−n1−n2) elements of 0. Further, the numerical array output unit includes an array element replacement unit that changes the array element of the initial array V1 generated by the initial array decision unit according to an input integer X, and outputs the array V. The encryption device also includes a text generation unit that generates encrypted text, based on the message, according to a polynomial which corresponds to the array V.

13 Claims, 16 Drawing Sheets

(1, 1, 1, -1, -1, 0, 0, 0)   V1

(1, 1, 1, -1, 0, 0, 0, -1)   V2

(1, 1, 1, -1, 0, 0, 0, -1)   V3

(0, 0, 0, 0, 0, 0, 0, 0)  V11

(0, 0, 0, 0, 1, 0, 0, 0)  V12

(0, 0, 0, 0, 1, 0, 1, 0)  V13

(0, 1, 0, 0, 1, 0, 1, 0)  V14

( 0, 1, 0, 0, 1, 0, 1, 0)   V21

(-1, 1, 0, 0, 1, 0, 1, 0)   V22

(-1, 1, 0, 0, 1, -1, 1, 0)   V23

(0, 0, 0, 0, 0, 0, 0, 1)  V31

(0, 0, 0, 0, 0, 0, 0, 1)  V32

(0, 1, 1, 0, 0, 1, 0, 1)  V41

(0, 1, 1, 0, 0, 1, 0, 1)  V42

(0, 1, 1, 0, -1, 1, -1, 1)  V43

(0, 0, 0, -1)  W1

(0, 0, -1, -1)  W2

( 0, 0, 0, 0, · · · · 0, 1, 0, · · · · 0)    V 5 1

( 0, 0, 1, 0, · · · · 0, 1, 0, · · · · 0)    V 5 2

NUMERICAL ARRAY OUTPUT DEVICE, A NUMERICAL ARRAY OUTPUT METHOD, AN ENCRYPTION DEVICE, AND A DECRYPTION DEVICE

BACKGROUND OF THE INVENTION (1) Field of the Invention

The present invention relates to a numerical array output device that converts an integer to an array, especially relates to the numerical array output device used for an encryption technique, an error correction technique and a digital signature technique as an information security technique.

(2) Description of the Prior Art

A private communication method is a method to have communication with a specific communication partner without leaking any communication content to anyone else. A digital signature method is a communication method that verifies communication content to the partner and proves a communication originator to be the person himself/herself. In this signature method, an encryption method called a public key encryption is used. The public key encryption is a method to easily manage an encryption key varied from each communication partner when there is more than one partner. This digital signature method is a mandatory and fundamental technology to communicate with multiple communication partners. To briefly explain the digital signature method, the encryption key in this method is different from the decryption key, and the decryption key is treated as private whereas the encryption key is in public. The public key encryption is described in detail in "Modern Encryption", Industry Book 1997 written by Tatsuaki Okamoto and Hiroshi Yamamoto (hereinafter referred to as "Literature 1").

One of the types of public key encryption is NTRU encryption. In this NTRU encryption, a code of the encryption is small in size compared with one of an elliptic curve encryption. The NTRU encryption code can be installed on a low-performance CPU such as one used for domestic appliances. Therefore, this encryption method has great future potential.

This NTRU encryption is described in detail in Jeffrey Hoffstein, Jill Pipher and Joseph H. Silverman, "NTRU: A ring based public key cryptosystem", Lecture Notes in Computer Science, 1423, pp. 267-288, Springer-Verlag, 1998 (referred to as "Literature 2").

Here is the explanation for the NTRU encryption.

In general, all of polynomials for f(X) are expressed as:

$$f(X)=f_0+f_1X+f_2X^2+\ldots+f_{N-1}X^{N-1} \bmod(X^N-1)$$

Below polynomial f(X) is to be expressed in relation with an n-dimensional vector $(f_0, f_1, f_2 \ldots, f_{N-1})$. Also, among this n-dimensional vector, the vector showing n 1 piece(s) of 1, n 2 piece(s) of -1, and other (n-n1-n2) piece(s) of 0 is expressed as L (n, n1, n2).

In this NTRU encryption, the decryption key is treated as a private key (hereinafter referred to as a private key), f (v) and Fp (v) are expressed with the following formula. A code attached with (v) such as f (v) and Fp (v) indicates a polynomial.

Private key $f(v) \in$ a set of polynomials $Lf$, a set of polynomials $Lf=L(263, 51, 50)$ Private key $Fp(v)$=private key $f(v)^{-1} \bmod p$ In short, a set of polynomials Lf is a set of polynomials having 51 pieces of 1, 50 pieces of -1, and 162 pieces of 0 in its factor $f_0, f_1, f_2 \ldots, f_{N-1}$. The private key f is a polynomial that belongs to the set of polynomials Lf. Also, p is an integer such as 3.

On the other hand, the encryption key that is in public (hereinafter referred to as a public key), h (v) is expressed in a following formula.

Public key $h(v)$=private key $f(v)^{-1} \times$polynomial $g(v)$ (mod $q$)

Polynomial $g(v) \in$ a set of polynomials $Lg=L(263, 24, 24)$

The public key h (v) here is a polynomial. Also, q is, for example, an integer of $2^7$.

In the NTRU encryption, encryption is executed based on the following formula by using this public key h (v). In this encryption, an encryption text e1 (v) is output for an input of a message m1 (v).

Encryption text $e1(v)=p$ polynomial $\phi(v) \times$public key $h(v)+m1(v)(\bmod q)$ polynomial $\phi(v) \in$ a set of polynomials $L\phi=L(263, 16, 16)$ Here, the polynomial $\phi(v)$ is selected at random from a set of polynomials $L\phi$.

In the meantime, the encryption text e1 (v) is decrypted through following two steps using above private keys f (v) and Fp (v), and a message m1'(v) is acquired.

$$a(v)=\text{private key } f(v) \times \text{encryption text } e1(v)(\bmod q) \quad (1)$$

$$m1'(v)=\text{private key } Fp(v) \times a(v)(\bmod p) \quad (2)$$

By the way, for breaking the code, there are two types of attacks: passive attacks and active attacks. Encryption such as RSA encryption, ElGamal encryption and NTRU encryption is created based on the assumption against the passive attacks only. The passive attacks, the active attacks, RSA encryption and ElGamal encryption are described in detail in the Literature 1.

Recently, a security proof scheming technology, which converts a general encryption method to a security proof scheme, is suggested as an encryption algorithm improvement technology that enhances a security level against any kind of attacks.

There is a method of using a hash function called as FOSRT in the security proof scheming technique.

FOSRT and the application of FOSRT to the NTRU encryption are described in detail in Jeffrey Hoffstein and Joseph H. Silverman, "Protecting NTRU Against Chosen Ciphertext and Reaction Attacks", NTRU Cryptosystems Technical Report #016, 2000 (referred to as "Literature 3"). The hash function is described in detail in the Literature 1.

The following is to explain a concrete method of FOSRT.

Encryption with FOSRT is executed through following three steps, and the encryption text E is output for an input of the message M.

(The First Step) A random number R1 is concatenated to the message M, and the concatenated message M∥R1 is acquired.

(The Second Step) A hash function value ha for the message M∥R1 is acquired based on the hash function.

$$Ha=H(M\|R1)$$

(The Third Step) The message M∥R1 and the hash function value ha are encrypted based on the encryption algorithm, and an encryption text E is acquired.

$$E = Enc(M\|R1, ha)$$

Next, the decryption by FOSRT is explained.

(The First Step) The encryption text E is decrypted and a message M∥R1' is acquired.

$$Dec(E) = M\|R1'$$

(The Second Step) A hash function value ha' of the message M∥R1' is acquired based on the hash function.

$$ha' = H(M\|R1')$$

(The Third Step) Encryption is executed based on the message M∥R1', the hash function value ha', and the same algorithm as one used for the above encryption, and an encryption text E' is acquired.

$$E' = Enc(M\|R1', ha')$$

(The Fourth Step) If the encryption text E and the encryption text E' are inconsistent, there is no output. If consistent, the message M∥R1' is divided into the message M' and the random number R1', and the required message M' is acquired.

A method for encryption and decryption when this FOSRT is applied to the NTRU encryption is explained as follows.

The encryption is executed through three steps, and the encryption text e (v) is output for the input of the message M (v).

(The First Step) A random vector R (v) is concatenated to the message M (v), and the message m (v) is acquired, wherein m(v)=M(v)∥R(v)

(The Second Step) A hash function value H (m (v)) of the message m (v) is calculated based on the hash function.

(The Third Step) The encryption text e (v) is acquired based on a formula, encryption text e (v)=pH(m(v))×public key h(v)+m(v)(mod q).

On the other hand, the decryption of the encryption text e (v) is executed through following five steps.

(The First Step) Get a polynomial a(v) based on a(v)=private key f(v)×encryption text e(v)(mod q).

(The Second Step) Get a message m'(v) based on m'(v) =private key Fp(v)×a(v)(mod p).

(The Third Step) Calculate a hash function value H (m'(v)) of the message m' (v), and get an encryption text e' (v) based on the encryption text e' (v)=pH (m' (v))×public key h(v)+m' (v)(mod q).

(The Fourth Step) Check if the encryption text e' (v) is consistent with the encryption text e (v).

(The Fifth Step) If the encryption text e'(v) is consistent with the encryption text e(v), divide m'(v)=M'(v)∥R'(v) (M'(v) is a decrypted message, and R'(v) is a random vector), and output the message M' (v).

As explained above, in the encryption and decryption processes when FOSRT is applied to the NTRU encryption, the hash function values, H (M(v)) and H (m'(v)) are required to belong to a set of polynomials Lφ, for example expressed as L (263, 16, 16).

The set of polynomials, Lφ is associated with a set of vectors having 16 pieces of 1, 16 pieces of −1 and 231 pieces of 0 among its factor $f_0, f_1, f_2, \ldots, f_{N-1}$.

Therefore, in association with the hash function value, it needs to get the n-dimensional array consisting of three values, i.e. 16 pieces of 1, 16 pieces of −1, and 231 pieces of 0.

However, in the encryption and decryption processes when FOSRT is applied to the NTRU encryption, these hash function values, H (m (v) and H (m' (v)) are integers.

Therefore, in order to apply FOSRT to the NTRU encryption, the n-dimensional array, which has n 1 piece(s) of 1, n2 piece(s) of −1, and other element(s) being −1 based on the hash function values, H (m (v)) and H (m' (v)) must be obtained. Here, n, n1 and n2 are positive integers.

Here, the following conditions need to be met in the method to obtain the n-dimensional array based on the hash function values, H (m(v)) and H (m'(v)).

(1) Always getting the same output for the same input.

(2) Well-balanced distribution of inputs and outputs (1) means that a different value is not output for the same input. (2) means that there is no case wherein only a specific output value is frequently output for inputs. When FOSRT is applied to the NTRU encryption, decryption would not be possible if both the sender and recipient are not capable of creating the n-dimensional array for output. If (1) is not satisfied, the encryption method itself would not be realized. Also, if (2) is not satisfied, the balance of output distribution for the hash function input would not be retained since the array is not evenly output based on the output value of the hash function value. Therefore, the security level of the hash function is declined. Hence, the security level of the NTRU encryption when FOSRT is applied is declined.

Here, a self-explanatory method to get the n-dimensional array having 1 piece(s) of 1, n 2 piece(s) of −1, and the number of other elements being 0.

FIG. 1 is a flow chart to show the method to get the n-dimensional array.

This conversion method inputs n1, n2 and an integer X as a hash function value, and outputs the n-dimensional array VJ having n1 piece(s) of 1, n2 piece(s) of −1, and the other (n−n1−n2) piece(s) of 0. Below supposes the i th element (from left) of the array VJ is VJ [i] ("i" is an integer from 1 to n).

Initially, consider when all of the elements of the array VJ are an array of 0 (Step S901).

Next, let a count value c1 of a counter c1' equal 1 (Step S902).

Next, let VJ [c1]=1 (Step S903).

Next, increment the count value c1 of the counter c1' (Step 904).

Next, verify that the count value c1 is >n1 (Step S905). If the count value c1 is not >n1 (No in Step S905), execute the process where VJ [c1]=1 again (Step S903).

If the count value c1 is >n1 (Yes in Step S905), set VJ [c1]=−1 (Step S906).

Next, increment the count value c1 (c1←c1+1) (Step S907).

Next, validate if the count value c1 is >n1+n2 (Step S908). If the count value c1 is not >n1+n2 (No in Step S908), execute the process where VJ [c1]=−1 (Step S906) once again.

If the count value c1 is >n1+n2 (Yes in Step S908), output the array VJ and terminate the process.

In this method, the array VJ output, regardless of the input integer X, has the original array having n1 piece(s) of 1, subsequently, n2 piece(s) of −1, and other elements being 0.

On the other hand, a common key encryption method, which encrypts a sending message with a key and decrypts it with the same key, is available as a private communication method. In the common key encryption method, there is a way to create an encryption text through a data replacement operation. For example, it is done as below.

This replacement method uses an array m[1], m[2], ..., m[n] and a key Ke (a positive integer) as an input, and outputs an encryption text e[1], e[2], ..., e[n]. The following example supposes to have two dimensional table tabs [j][i] ($1 \leq j \leq n!$, $1 \leq i \leq n$) in advance.

At first, set 1 in the count value c of the counter c'.

Next, substitute m [c] for e [Tab [K][c]]. This process is executed until the count value c of the counter c' becomes n.

Then, when the count value c of the counter c' becomes n, the encryption text e is output and the process is terminated.

Although it is possible to consider such a replacement method is applied to the aforementioned method for obtaining the n-dimensional array based on the hash function value, it requires having n*n piece(s) of tables.

However, the aforementioned self-explanatory method to get the n-dimensional array, its output result inclines towards one type and does not satisfy the above condition (2) (Well-balanced distribution of inputs and outputs). In this case, it looses the effect of applying FOSRT and its security level becomes vulnerable against passive attacks. Therefore, there is a problem wherein the security level of the NTRU encryption declines when FOSRT is applied to the NTRU encryption according to this method.

Also, even if the replacement method used as the above mentioned common key encryption is applied to get the n-dimensional array, it uses a memory table requiring a vast amount of memory, which is regarded as a problem.

SUMMARY OF THE INVENTION

The present invention is executed based on consideration of the above problems, and aims at providing an array output device that outputs a well-balanced n-dimensional array based on an integer value such as an output value of a hash function value without using as much memory.

In order to achieve the above objective, the array output device is a numerical array output device that outputs various n-dimensional arrays consisting of n K-value integers, each of which is one of K kinds of integers, depending on an input integer, comprising: an initial array decision unit operable to tentatively decide an initial array; and a changing unit operable to change an array element of the initial array decided by the initial array decision unit into the n-dimensional arrays based on the input integer.

By doing so, without using as much memory, the n-dimensional array based on the integer can be evenly acquired, and it makes it possible to acquire the n-dimensional array at the same time, therefore, retaining uniformity based on the integer values evenly distributed such as the hash function value, etc.

The numerical array output device described here may be an array output device, wherein the initial array decision unit tentatively decides one of the n-dimensional arrays consisting of the n K-value integers as the initial array, and the changing unit replaces the array element of the initial array decided by the initial array decision unit based on the input integer, and outputs the replaced initial array.

Also, the above array output device may be an array output device, wherein the initial array decision unit tentatively decides, as the initial array, an array, in which all of the array elements are the K-value integer P3, and the changing unit replaces the array element, which is located at a position based on the input integer among the array element of the integer P3 in the initial array decided by the initial array decision unit, with the other integer P1 of the K-values, and outputs the replaced initial array.

It may also be an array output device, wherein the input integer is indicated by a plural number of bit information, and the changing unit includes a split unit operable to split the input integer into individual split information consisting of a specific number of bit information, and a third integer placement unit operable to replace the array element, which is located at a position based on the split information among the array element of the integer P3 in the initial array, with other integer P1 of the K-values.

To achieve the above objectives, a numerical array output method for outputting various n-dimensional arrays consisting of n K-value integers, each of which is one of K kinds of integers, depending on an integer input, including: an initial array decision step for tentatively deciding an initial array; and a changing step for changing an array element of the initial array decided by the initial array decision step into the n-dimensional arrays based on the input integer.

According to this structure, the same effect as the above can be expected.

Furthermore, the encryption device of the present invention is a device that encrypts a message comprising: a function value output unit operable to calculate the message with a one-way converting function and output its result as a function value; a numerical array output unit including an initial array decision unit that tentatively decides an initial array and a changing unit that changes an element of the initial array decided by the initial array decision unit into an n-dimension array based on the function value output by the function value output unit, and operable to output various n-dimensional arrays consisting of n K-value integers, each of which is one of K kinds of integers, depending on the function value; and an encryption text generation unit operable to generate an encryption text based on the array output by the numerical array output unit.

By doing so, it becomes possible to keep uniformity and obtain the n-dimensional array based on the integer value evenly distributed by a one-way converting function like the hash function value of a message, and enhance a security level of the encryption text.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

The First Embodiment

The following explains an encryption device related to the first embodiment of the present invention with reference to diagrams.

Figure 2A:
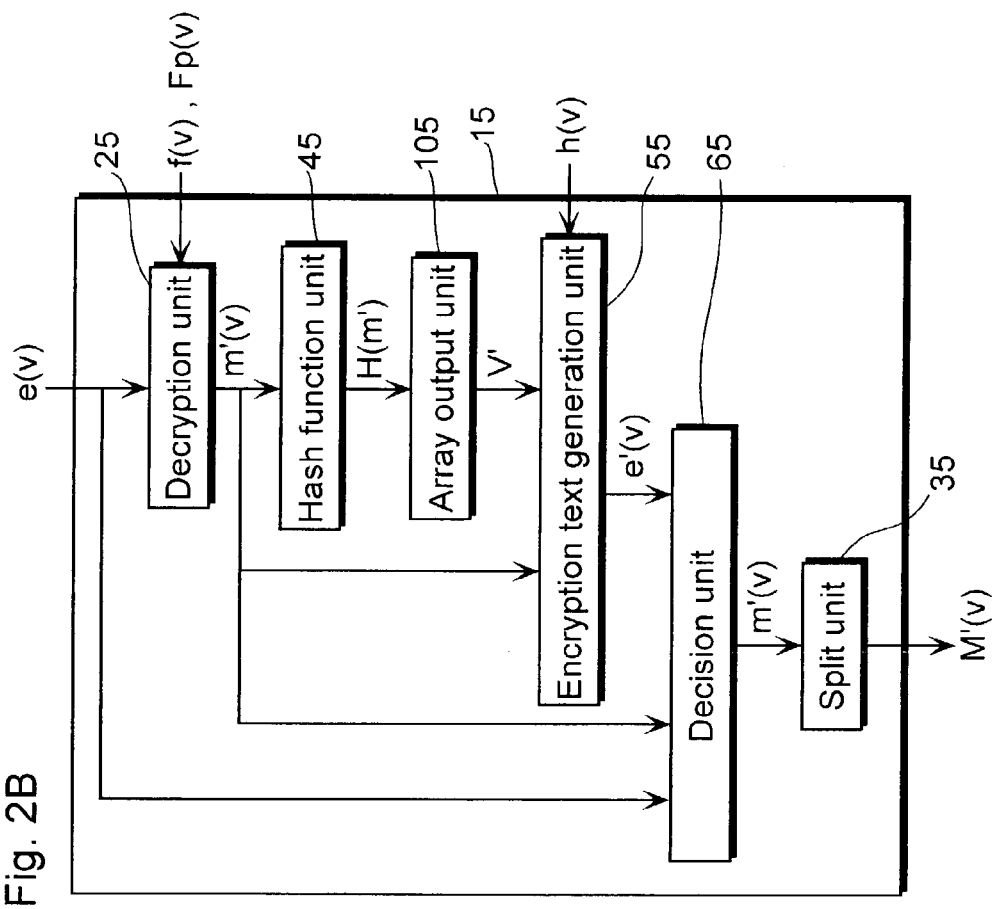
FIG. 2 A is a block diagram to show structure of an encryption device related to a first embodiment and FIG. 2 B is a block diagram to show structure of a decryption device.
Figure 2B:
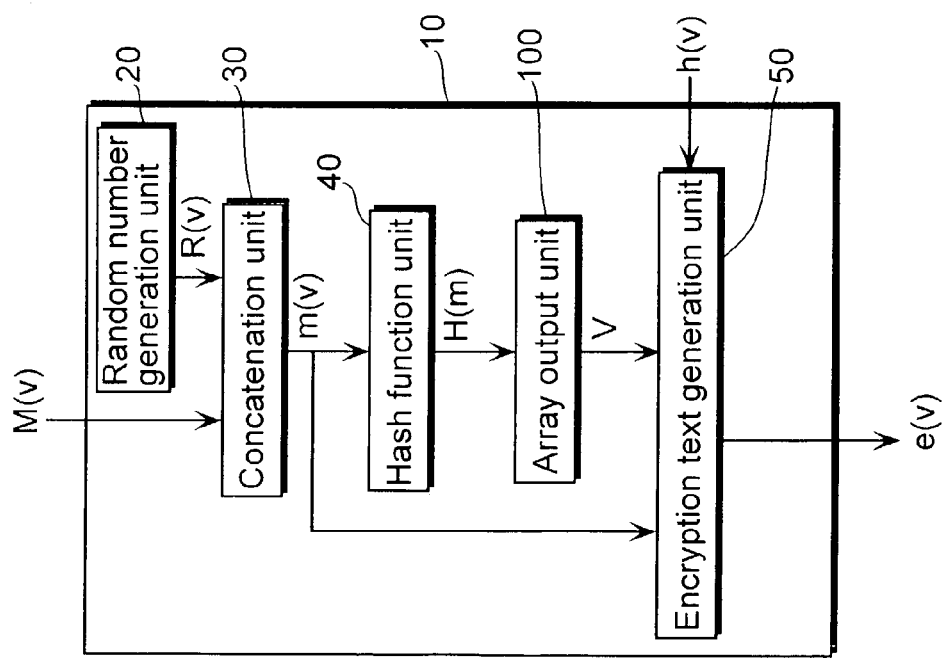

FIG. 2 (A) is a block diagram to show structure of the encryption device related to the first embodiment of the present invention.

The encryption device 10 includes a random number generation device 20, a concatenation unit 30, a hash function unit 40, an array output unit 100, and an encryption text generation unit 50, which generates an encryption text e (v) based on a message M (v) acquired and a public key h (v). A symbol (v) such as a message M (v), a public key h (v) and an encryption text e (v) indicates a polynomial. Also, the same symbols are used for those same as conventional examples.

The random number generation unit 20, the concatenation unit 30, the hash function unit 40, the array output unit 100, and the encryption text generation unit 50 comprising this encryption device 10 execute processes respectively using software from a microcomputer, and those processes are executed by using the microcomputer's CPU and memory.

As described in the conventional example, this encryption device 10 applies FOSRT, a security proof scheme, to the NTRU encryption and generates an encryption having a higher security level than the NTRU encryption.

The random number generation unit 20 generates a random vector R (v).

The concatenation unit 30 concatenates the vector R (v) generated by the random number generation unit 20 with a message M (v), generates a message m (v), and outputs it to the hash function unit 40 and the encryption text generation unit 50.

The hash function unit 40 applies the hash function, which is a one-way function, to the message m(v) in order to produce a hash function value H (m) and outputs it to the array output unit 100. Here, the hash function is the one-way function, and the hash function value H (m) output from the hash function unit 40 is an integer that is hereinafter referred to as an integer X.

The array output unit 100 generates the n-dimensional array V based on the integer X output from the hash function unit 40 and outputs it to the encryption text generation unit 50.

The encryption text generation unit 50 generates the encryption text e (v) based on a polynomial φ (v) corresponding to the n-dimensional array V output from the array output unit 100, the message m (v) from the concatenation unit 30, the public key h (v) and a formula of encryption text e (v)=p polynomial φ (v)×public key h (v)+m (v) (mod q), and outputs it externally. P and q are integers, for example p is 3 and q is $2^7$.

Meanwhile, FIG. 2 (B) is a block diagram to show structure of the decryption device related to the first embodiment in the present invention.

This decryption device 15 contains a decryption unit 25, a hash function unit 45, an array output unit 105, an encryption text generation unit 55, a decision unit 65 and a split unit 35, which decrypts the encryption text e (v), which is encrypted by the encryption device 10, based on the input encryption text e (v), a private key f (v), Fp (v), and a public key h (v), and outputs the original message M' (v).

The decryption unit 25, the hash function unit 45, the array output unit 105, the encryption text generation unit 55, the decision unit 65, and the split unit 35, comprising this decryption device 15, execute processes respectively through the software of the microcomputer, and those processes are done by using the microcomputer's CPU and memory.

The decryption unit 25 generates the message m' (v), which is a decryption value corresponding to the original message, from the encryption text e (v) input based on following formulas.

$a(v)$ private key $f(v)\times$encryption text $e(v)(\bmod q)$ $m'(v)$ private key $Fp(v)\times a(v)(\bmod p)$ The hash function unit 45 calculates the hash function value H (m') of the message m' (v), and outputs it to the array output unit 105. The hash function value H (m') output from the hash function unit 45 is an integer, which is hereinafter referred to as an integer X'.

The array output unit 105 generates the n-dimensional array V' based on the integer X' output from the hash function unit 45 and outputs it to the encryption text generation unit 55.

The encryption text generation unit 55 generates an encryption text e' (v) based on the polynomial φ' (v) corresponding to the n-dimensional array V' output from the array output unit 105, the message m' (v) from the decryption unit 25, the public key h (v) and the formula of encryption text e' (v)=p polynomial φ' (v)×public key h (v)+m' (v)(mod q), and outputs it to the decision unit 65.

The decision 65 inputs the encryption text e (v) and the encryption text e' (v), decides whether both are consistent, and outputs the message m' (v) to the split unit 35 if decided to be consistent.

The split unit 35 divides the message m' (v) from the decision unit 65 into a message M' (v) and a random vector R' (v), and outputs the original message M' (v).

Next, the array output unit 100 in the encryption device 10 is explained with reference to diagrams. Because the array output unit 105 in the decryption device 15 has the same structure as the array output unit 100 and performs the same action, its explanation is omitted.

Figure 3:
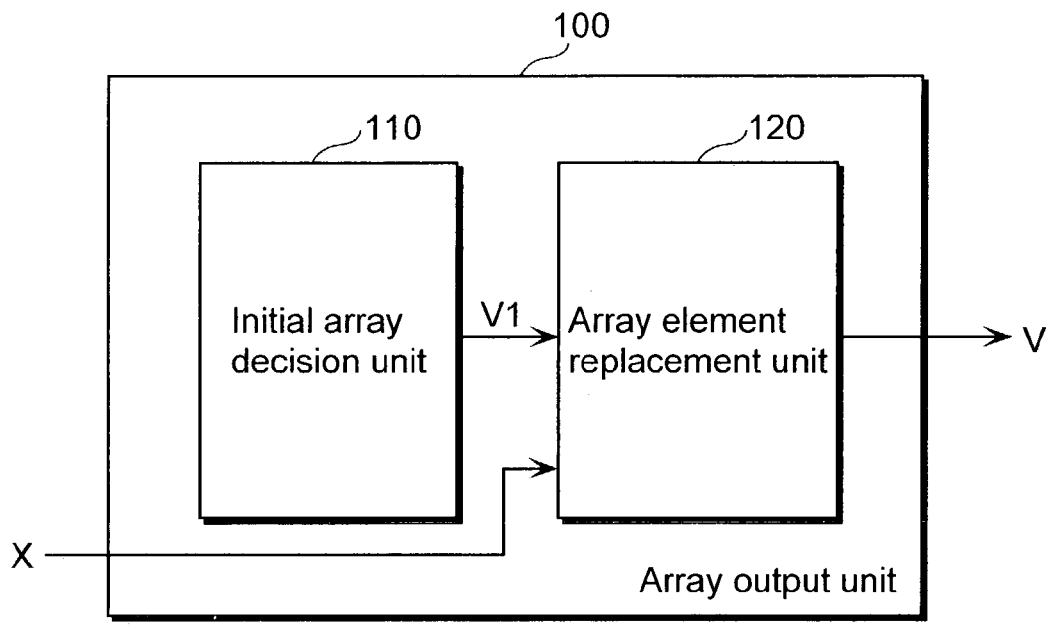
FIG. 3 is a block diagram to show structure of the above array output unit.

FIG. 3 is a block diagram to show structure of the array output unit 100.

This array output unit 100 uses the integer X as its input and outputs an array V that belongs to L (n, n1, n2). L (n, n1, n2) here is the entire n-dimensional array having n1 piece(s) of 1, n2 piece(s) of −1, and other (n−n1−n2) piece(s) of 0, and these n, n1 and n2 are preset in the array output unit 100. The array output unit 100 consists of an initial array decision unit 110 and an array element replacement unit 120.

The initial array decision unit 110 is to make an initial decision of the array V and generates the following initial decision array V1.

$$V1[i]=1 (1 \leq i \leq n1) \quad (1)$$

$$V1[i]=-1 (n1+1 \leq i \leq n1+n2) \quad (2)$$

$$V1[i]=0 (n1+n2+1 \leq i \leq n) \quad (3)$$

Here, V1[i] is the i th (i is an integer from 1 to n) array element (element) (from left) of the initial decision array V1.

Figure 4:
FIG. 4 is a diagram to show an array status of an array output from the above array output unit.
Figure 4:

FIG. 4 is a diagram to show an array status of the array V in each phase of the array output unit 100. FIG. 4 indicates each array status of the array V, for example (n=8, n1=3, n2=2) in case of L (8, 3, 2). In FIG. 4, the array status on the top shows the initial decision array V1 decided by the initial array decision unit 110.

The array element replacement unit 120 inputs the initial decision array V1 output from the initial array decision unit 110 and the integer X, and outputs the n-dimensional array V having n1 piece(s) of 1, n2 piece(s) of −1, and other (n−n1−n2) piece(s) of 0. That is to change an array element of the initial decision array V1 decided by the initial array decision unit 110.

The following explains the processes executed by the array element replacement unit 120.

Figure 5:
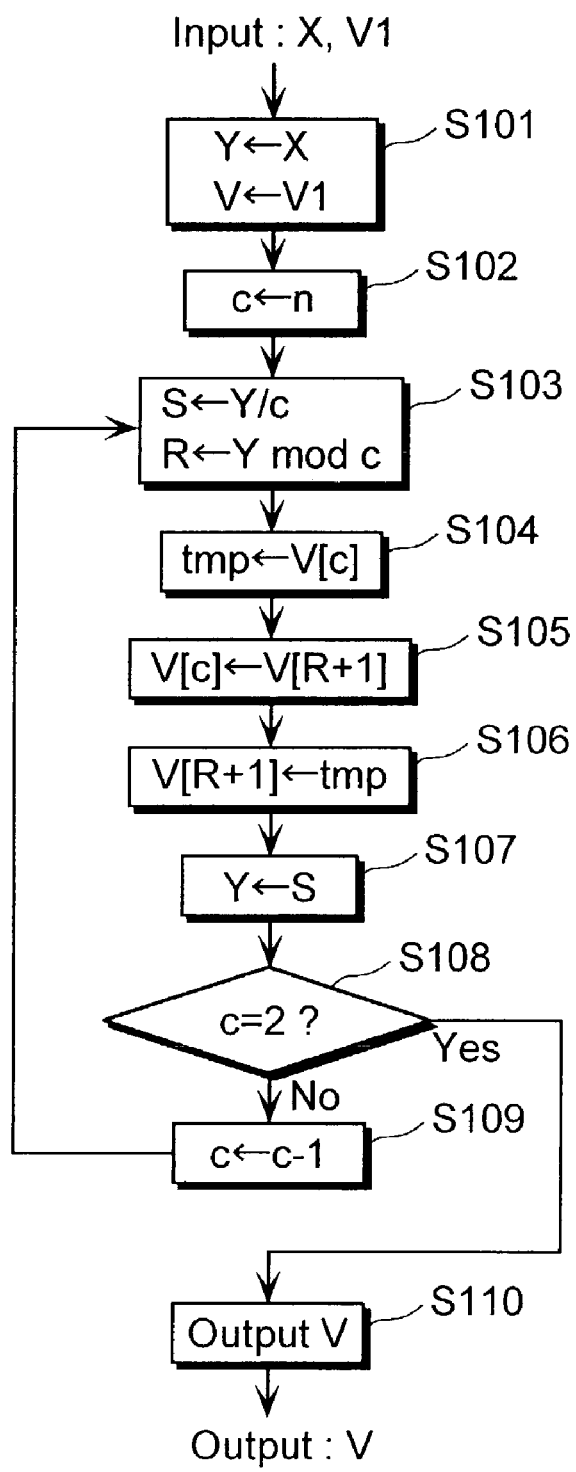
FIG. 5 is a flow chart to show an action of the above array output unit.

FIG. 5 is a flow chart to show processes executed by the array element replacement unit 120.

Let a value of a counter c' be a count value c below.

At first, the array element replacement unit 120 substitutes the integer X for an argument Y and substitutes the array V for the initial decision array V1. It means that it substitutes V1 [i] for V [i] for all of i (i is an integer from 1 to n.) (Step S101).

Next, the array element replacement unit 120 sets the count value c of the counter c' to n (Step S102).

Next, in the array element replacement unit 120, a quotient of the argument Y divided by the count value c is treated as S, and the remainder as R (Step S103).

Next, the array element replacement unit 120 regards tmp←V[c] (Step S104). That is to substitute the c th element V[c] of the array V for a register tmp.

Next, the array element replacement unit 120 regards V[c]←V[R+1](Step S105). That is to substitute the (R+1)th element of the array V for the c th element of the array V.

Next, the array element replacement unit 120 regards V[R+1]←tmp (Step S106). That is to substitute the content of the register tmp for the (R+1)th element of the array V.

By the process of this tmp=V[c], V[c]=V[R+1], V[R+1] =tmp (Step S104 to Step S106), the c th element and (R+1)th element are replaced.

Next, the array element replacement unit 120 substitutes the quotient S for the argument Y (Step S107).

Next, the array element replacement unit 120 validates whether the count value c is 2 or not (Step S108). If the count value c is validated to be 2 (Yes in Step S108), the array element replacement unit 120 outputs the array V (Step S110) and terminates the process.

On the other hand, if the array element replacement unit 120 validates the count value c is not 2 (No in Step S108), it decrements the count value c (c←c−1) (Step S109), and again moves to the process to get S for the quotient of the argument Y divided by the count value c and to get R for its remainder (Step S103).

In such a way, the array element replacement unit 120 repeats the process in each step starting from the process to get the quotient S and the remainder R (Step S103) to the process to decrement the count value c (Step S109) for each case the count value c of the counter c' is from n to 2. After each element of the array V is replaced and the process for the count value c=2 is completed, the array element replacement unit 120 outputs the array V.

Entire actions of the array output unit 100 are explained here. In the array output unit 100, the initial array decision unit 110 at first decides the initial decision array V1 of the n-dimensional array having n1 piece(s) of 1, n2 piece(s) of −1, and other being 0, and outputs it to the array element replacement unit 120.

Next, the array element replacement unit 120 acquires the initial decision array V1 output from the initial array decision unit 110 and the integer X input to the array output unit 100, replaces each element of the initial decision array V1 based on the integer X, and outputs the n-dimensional array V having n1 piece(s) of 1, n2 piece(s) of −1, and other element(s) being 0.

Actions of this array output unit 100 are explained with a concrete example.

Actions of this array output unit 100 are explained by using numbers actually input, for example the integer X=39356, n=8, n1=3, n2=2.

At first, the initial array decision unit 110 decides the initial decision array V1 that satisfies n=8, n1=3, n2=2, and outputs it to the array element replacement unit 120 (See FIG. 4).

Then, the array element replacement unit 120 substitutes the input integer X for the argument Y, regards the argument Y=39356, and substitutes the initial decision array V1 for the array V (Step S101).

Next, the array element replacement unit 120 regards the count value c=8 (Step S102).

Next, the array element replacement unit 120 calculates the quotient S and the remainder R, and regards the quotient S=4919 and the remainder R=4 (Step S103).

Next, the array element replacement unit 120 replaces the (R+1)th element in the array V, meaning the fifth element "−1" with the eighth element "0" (Step S104~Step S106) and creates the array status indicated in the array V2 in FIG. 4.

Next, the array element replacement unit 120 substitutes 4919 for the argument Y (Step S107).

Then, because the count value c is 8, and not 2 (No in Step S108), the array element replacement unit 120 decrements the count value c to make the count value c=7 (Step S109).

Then, the array element replacement unit 120 calculates the quotient S and the remainder R once again from the argument Y=4919, and the count value c=7, and gets the quotient S=702 and the remainder R=5 (Step S103).

Next, the array element replacement unit 120 replaces the sixth element "0" with the seventh element "0" from left in the array V (Step S104~Step 5106), and creates the array status indicated in the array V3 in FIG. 4.

The array element replacement unit 120 in this way replaces elements in the array V based on the quotient S and the remainder R when the argument Y is divided by the count value c for each case the count value c is from n to 2 (a repetition of the processes in Step S103→Step S109), and executes the replacement process of each element in the initial decision array V1. Then, when the above process is completed for the case of the count value c=2, the array element replacement unit 120 outputs the array V.

The explanation below is for a fact that the array V output from the array output unit 100 is well balanced based on the input integer X.

Based on the integer X that satisfies $0 \leq X \leq (n!-1)$ (n! shows "n factorial". To be specific, $n! = n \times (n-1) \times \ldots \times 2 \times 1$), the array output unit 100 evenly outputs the array L (n, n1, n2). The following gives an explanation based on a premise that X is limited to be $0 \leq X \leq (n!-1)$.

In the array element replacement unit 120, elements of the initial decision array V1 are replaced. The following focuses in detail on elements of the initial decision array V1 replaced by the array element replacement unit 120. To make the following explanation be easily understood, in the structure of the above array element replacement unit 120, the remainder resulted from the process of $R \leftarrow Y(\text{mod } c)$ (Step S103) is treated as $R\_i$ when the count value c is i (i=n, n-1, n-2, ..., 3, 2).

An overall flow of the explanation is as follows.

(1) Explain a fact that the replacement process is not duplicated.

(2) Using the result of (1), explain a fact that the process content in the integer X and the array element replacement unit 120 corresponds to a 1 to 1 relationship.

(3) Calculate how many types of the integer X resulting the same array.

The calculation of (3) makes it possible to indicate the number of types of the integer X is identical regardless of the array V so that it proves that the output is well balanced for the input.

At first, (1) "the fact that the replacement process is not duplicated," is explained below.

The below explanation provides the fact that the same value is not repeatedly replaced. It means that the value for which replacement process is completed is not regarded as a subject for replacement in subsequent processes.

When the Count Value c of the Counter c' is n

A significance of the actions in Step S104, Step S105, Step S106 (hereinafter referred to as "a replacement process when the count value c is n") is that the n th element V1 [n] in the initial decision array V1 is replaced by the $(R\_n+1)$th element V1 $[R\_n+1]$. $R\_n$ here is the remainder when the argument Y is divided by n so that it can be some number from 0 to n-1.

When the Count Value c is n-1

At this time, the n-1 th element of the array V, which is in the status where the replacement process is just completed when the count value c is n, is replaced with the $(R\_(n-1)+1)$th element. Because $R\_(n-1)$ here is the remainder when the argument Y is divided by the counter value (n-1), the value can be some number from 0 to n-2. Therefore, the (n-1)th element of the array V, which is in the status the replacement process when the count value c is n-1 is just completed, is the $(R\_(n-1)+1)$th element of the array V at the point when the replacement process is just completed when the count value c is n. Also, note that the n th element of the array V in the status the replacement process is completed when the count value c is n is not treated as a subject for replacement.

When the Count Value c is n-2 or Below

A case the count value c is n-2 or below is taken into account. In such a case, it is the same as the case when the count value c is n-1. The i th element of the array V in the status the replacement process is completed when the count value c is i is the $(R\_i+1)$th element of the array V in the status the replacement process is completed when the count value c is (i+1). Note that the replacement process when the count value c is (i+1) is executed before the replacement process when the count value c is i. After this point, the i th element of the array V will never be replaced by other values. Because if $j \leq i-1$, $R\_j$ is the remainder when the argument Y is divided by j so that it satisfies $R\_j \leq j-1$. Consequently, it becomes $(R\_j+1) \leq i-1 < i$.

Each element of the array V after the process of the array element replacement unit 120 is completed, i.e. in the status all of the processes for n to 2 of the count value c are completed, is the one each element of the initial decision array V1 is replaced.

Next, uniqueness in the process of the array element replacement unit 120 is explained.

Using the above result (the replacement is not duplicated), the following explains the fact the process content in the integer X and the array element replacement unit 120 corresponds to the 1 to 1 relationship.

Relationship Between the Integer X and Series

Suppose the integer X is an integer that satisfies $0 \leq X \leq (n!-1)$. In this case, the value of the argument Y in Step S103 when the count value c of the counter c' is c, is $Y\_c$, the quotient S is $S\_c$ and the remainder R is $R\_c$ (the value of $R\_c$ is as defined as before.). In this case, if the action done in Step S103 is expressed by a formula, it is:

$$Y\_c = c \times S\_c + R\_c$$

However, it is $0 \leq R\_c \leq (c-1)$. Also, if the action done in Step S107 is expressed by a formula, it is:

$$Y\_(c-1) = S\_c$$

If summarized by applying to a case of c=n, (n−1), ..., 2, it is as follows.

(paying attention that $X = Y\_n$)

$$X = (n \times (n-1) \times \ldots \times 3) \times R\_2$$

$$+ (n \times (n-1) \times \ldots \times 4) \times R\_3$$

$$\ldots$$

$$+ (n \times (n-1)) \times R\_(n-2)$$

$+n \times R\_(n-1)$ $+R\_n$

R_i here is an integer that satisfies $0 \leq R\_i \leq i-1$. From the integer X, it is obvious that R_2, R_3, . . . , R_(n−2), R_(n−1), R_n are decided uniquely. Also, the other way around is apparent. Therefore, the relationship between the integer X being $0 \leq X \leq (n!-1)$ and R_2, R_3, . . . , R_(n−2), R_(n−1), R_n is 1 to 1.

Relationship Between Series and Replacement

As mentioned previously, in the first embodiment, each element of the initial decision array V1 is replaced according to the integer X to output the array V. As mentioned above, its replacement is decided by series of R_n, R_(n−1), R_(n−2), . . . , R_3, R_2. Because the n th element of the array V at the time of the replacement process completion when the count value c is n is the (R_n+1)th element of the initial decision array V1. From this point, the n th element of the array V will not be replaced. In the same way, the n th element of the array V at the time of the replacement process completion when the count value c is i is the (R_i+1)th element of the array V at the time of the replacement process completion when the count value c is (i+1). From this point, the i th element of the array V will not be replaced, which means from the n th element to the i th element of V, the elements will not be changed. Also, it is because the array V at the time of the replacement process completion when the count value c is (i+1) is decided by the series R_n, R_(n−1), . . . , R_(i+1).

Also, the replacement method for n piece(s) of elements of the initial decision array V1 is regarded to be "n piece(s) of original replacement". For the optional "n piece(s) of original replacement", its replacement can be realized by the above processing content in the array element replacement unit 120. It is explained as follows. As expression of the replacement, an ordered string, which is a result of replacing n piece(s) of sequential element V[1], V[2], . . . , V[n] as its input, is used. For example, one replacement is expressed as follows.

(V[σ1], V[σ2], . . . , V[σn])

However, as a set, $\{1, 2, \ldots, n\} = \{\sigma 1, \sigma 2, \ldots, \sigma n\}$ At this point, it is obvious that the value of σn is decided by the above R_n. Also, the value of σ(n−1) is decided by values of R_n and R_(n−1), and it is apparent that it is evenly selected from all values other than σn. The same applied to the following. The value of σi is decided by R_n, R_(n−1), . . . , R_(i+1), and it is decided from all values other than σn, u (n−1), . . . , a (i+1). Therefore, according to the above array element replacement unit 120, the replacement method for the entire initial decision array V1 is decided. Consequently, it is understood that a relationship of the replacement method between the integer X being $0 \leq X \leq (n!-1)$ and the initial decision array V1 is 1 to 1. Discussions described up to this point is based on the idea that an element is regarded as different if its placement information, i.e. an index, of each element is different, no matter the value in each element of the initial decision array V1 is identical or not. However, actually each element of the initial decision array V1 is composed of n1 piece(s) of 1, n2 piece(s) of −1, and (n−n1−n2) piece(s) of 0. If the placement set of n1 piece(s) of 1 is identical in the array V output, the value of the array V is also identical. The same can be applied to n2 piece(s) of −1 and (n−n1−n2) piece(s) of 0. The following explains how frequently the same output array may happen to be output.

Next, uniformity of the output from the array element replacement unit 120 is explained.

As mentioned previously, the relationship between the integer satisfying $0 \leq X \leq (n!-1)$ and "n piece(s) of original replacement" is 1 to 1. Let the conversion be τ. Using τ corresponding to the integer X, the array element replacement unit 120 outputs τ(V1) as V. From τ to τ (V1) are uniquely decided. For the following τ0, below explains how many conversion τ1 that becomes τ0 (V1)=τ1 (V1) exists.

n1 piece(s) of 1 in τ0 (V1) stays the same as the value of τ0 (V1) even if its position is replaced. In the same way, the result of τ0 (V1) is not changed even if positions are replaced for n2 piece(s) of −1 and (n−n1−n2) of 0. However, if a position of 1 is replaced with a position of 0, or if the position of 1 is replaced with a position of −1, the result of τ0 (V1) will be different. Therefore, any possible τ1 exists only for a combination of position replacement in n1 piece(s) of 1 and n2 piece(s) of −1 and (n−n1−n2) piece(s) of 0. Because there are n1 piece(s) of 1, it has (n1)! types. In the same way, for the replacements of n2 piece(s) of −1 and (n−n1−n2) piece(s) of 0, there are (n2) ! types and (n−n1−n2) ! types available for each. Therefore, there are (n1)!×(n2)!×(n−n1−n2) ! types of τ1.

Consequently, it can be said that the array output unit 100 in the first embodiment can convert n! types of integer X in n!/((n1)!×(n2)!×(n−n1−n2)!) types of replacements. Also, previous discussion reveals that its uniformity is decided by n1 and n2 regardless of replacement types.

As explained above, the array output unit 100 can evenly output the n-dimensional array based on the input integer X. Also, according to above explanation, it is apparent that the array output unit 100 always performs the same output for the same input.

Discussion up to this point is for the case of X<n!. But the same type of discussion can also takes place for the case of X>n! by taking the remainder of X divided by n!.

A case when an actual parameter is used is explained. When n=263, n1=16, n2=16, the array that belongs to L (n, n1, n2) has $n!/((n1)! \times (n2)! \times (n-n1-n2)!) \approx 2^{163}$ types. $x^y$ indicates the y th power of X. $n! \approx 2^{1741}$ As the output length of the hash function to keep the uniformity of the hash function distribution, 1741 bits or more is required. Although the hash function having 1741 bits or more as its output does not currently exists, there is a way to calculate the hash function value by using the hash function, which has a longer length than the output length of the hash function. Therefore, even if any hash function value having 1741 bits or more as its output is required, it does not have any problem that hampers to structure the security encryption method.

According to this embodiment, the array output unit 100 can evenly output the n-dimensional array based on the input integer X. Because of this, in the case FOSRT is applied to the NTRU encryption, the array output unit 100 can evenly output the n-dimensional array based on the hash function value H (m) output from the hash function unit 40. It is possible to retain the uniformity of the hash function distributed by the hash function unit 40. Therefore, the encryption device 10 can generate the encryption text e (v) at a high security level.

Moreover, since the array output unit 100 sets the array V only based on the integer X, it does not require using a memory table and only requires a little memory.

Also, as the array output unit 105 of the decryption device 15 in FIG. 2 (B) has the same structure as the array output unit 100, it is possible to decrypt the encryption text encrypted by the encryption device 10.

In the present embodiment, though the process executed by each unit composing the encryption device 10 and the decryption device 15 is supposed to be done through the software of the microcomputer, it may also be activated by hardware such as an electric circuit or an IC.

Additionally, the structure is not only limited to the presumed structure that outputs the array based on the hash function value with using the array output unit 100 on the encryption device 10.

Furthermore, the array output unit 100 indicated in FIG. 3 includes the initial array decision unit 110 and the array element replacement unit 120, which has a structure such that the array element replacement unit 120 replaces each element of the initial decision array V1 decided by the initial array decision unit 110 based on the integer X. However, it may be an array output unit (hereinafter referred to as an array output unit 100a) having a structure that executes the same process as the array element replacement unit 120, which inputs the integer X and the preset initial decision array V1, replaces the initial decision array V1 based on the integer X, and outputs the array V.

Because the array output unit 100a structured in this way executes the same process as the array element replacement unit 120, it can retain the uniformity of the hash function distribution, does not use a table, and replaces the array V1 only from the integer X information. Therefore, it does not require a vast amount of memory.

Also, the array output unit 100a may be an encryption device or an encryption method, which uses the integer X as a key, the initial decision array V1 as a message, and the array V as an encryption text. Furthermore, it may also be an encryption device or an encryption method, which uses the array output unit 100a.

The Second Embodiment

The following explains the encryption device related to the second embodiment for the present invention.

The encryption device in the present embodiment is an array output unit 200 having different a structure than the array output unit 100 of the encryption device 10 in FIG. 2 (A). Since structure of the other parts are the same, their explanation is omitted.

Figure 6:
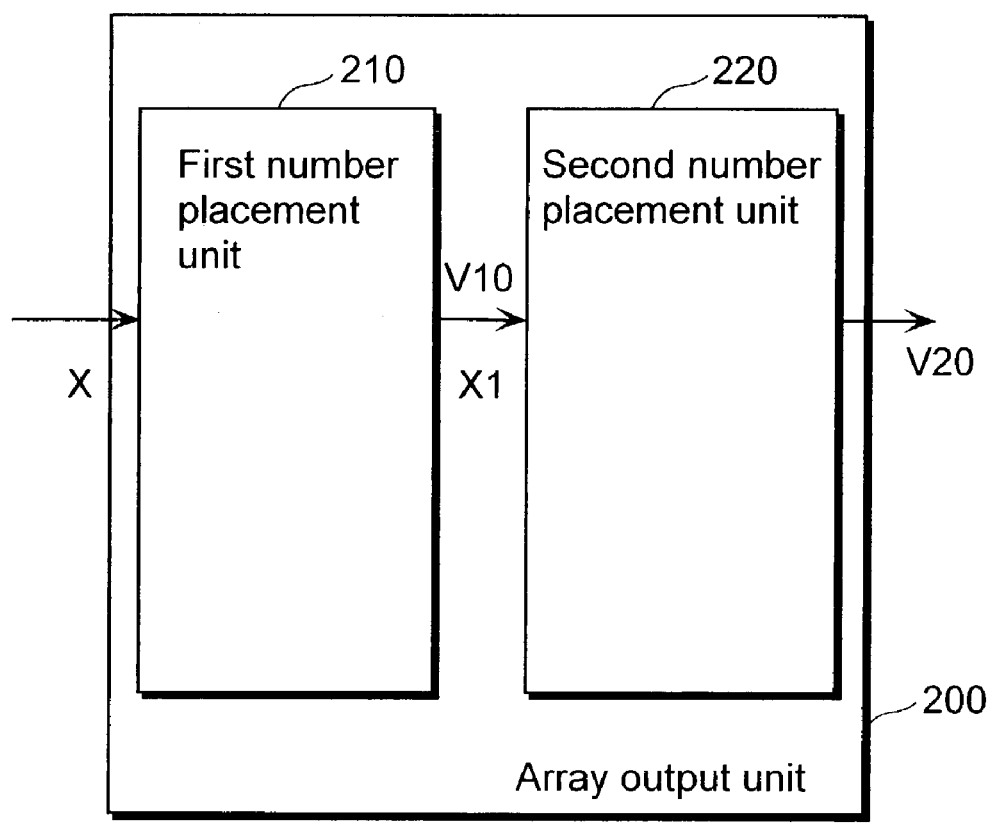
FIG. 6 is a block diagram to show structure of the array output unit related to a second embodiment.

FIG. 6 is a block diagram to show the structure of the array output unit 200 in the present embodiment.

This array output unit 200 inputs the integer X and outputs the array V20 that belongs to L (n, n1, n2). L (n, n1, n2) here indicates the entire n-dimensional array having n1 piece(s) of 1, n2 piece(s) of −1, and other (n−n1−n2) piece(s) of 0, further, n, n1, n2 are preset in the array output unit 200.

The array output unit 200 consists of a first number placement unit 210 and a second number placement unit 220, which executes processes in the same way as the array output unit 100 through the software of the microcomputer or hardware such as an electric circuit.

The first number placement unit 210 uses the integer X as its input and outputs the n-dimensional array V10, which has n1 piece(s) of 1 and other element(s) of 0, and the integer X1, which is resulted by a specific calculation on the integer X, to the second number placement unit 220. The first number placement unit 210 tentatively decides an array element having all array elements being 0, and changes the array elements of 0 to 1 based on the integer X.

The second number placement unit 220 inputs the array V10 output from the first number placement unit 210 and the integer X1, and outputs the n-dimensional array V20 having n1 piece(s) of 1, n2 piece(s) of −1 and other (n−n1−n2) piece(s) of 0. The second number placement unit 220 here changes the array element with 0 in the array output by the first number placement unit 210 to −1.

At first, actions of the first number placement unit 210 are explained.

Figure 7:
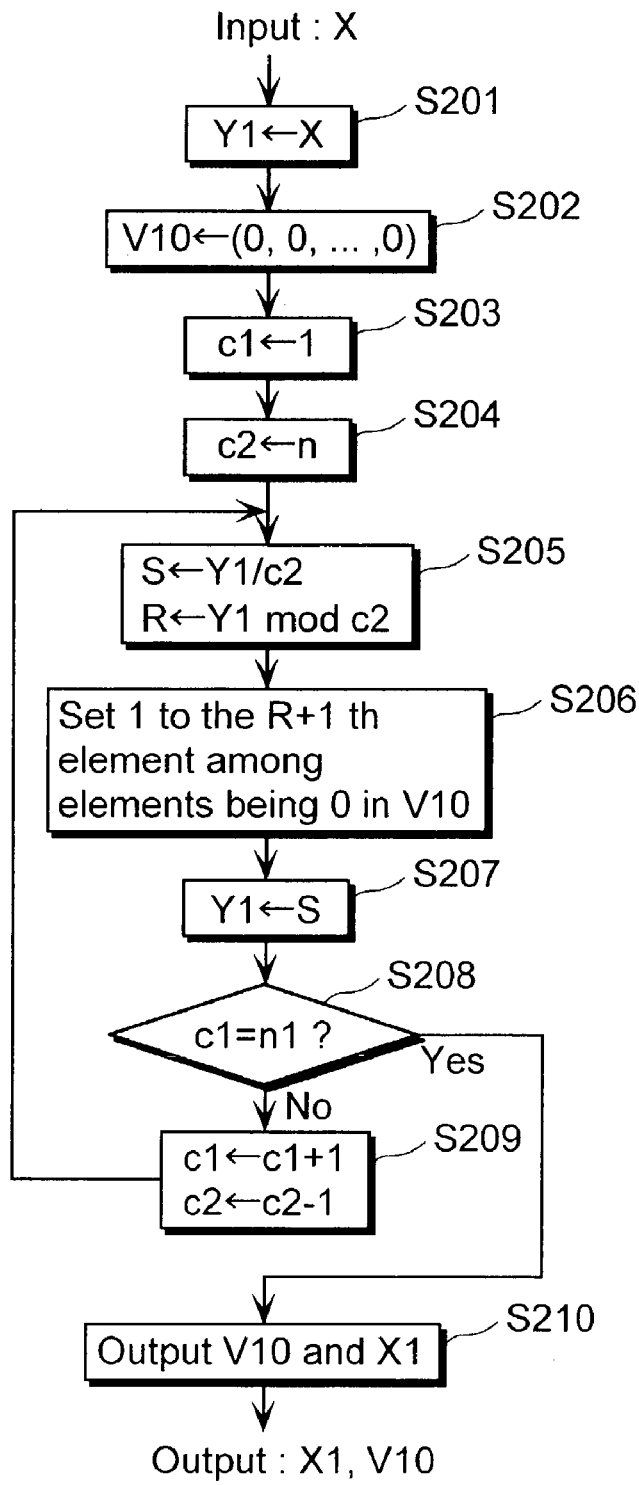
FIG. 7 is a flow chart to show an action of a first number placement unit in the above array output unit.

FIG. 7 is a flow chart to show the process executed by the first number placement unit 210. The first number placement unit 210 executes the process in the following steps. In the below explanation, the i th element (from left) in the array V10 is to be V10 [i]. Also, a value of the counter $c_1'$ is to be a count value $c_1$, and a value of the counter $c_2'$ is to be a count value $c_2$.

Figure 8:
FIG. 8 is a diagram to show an array status of an array output from the first number placement unit in the above array output unit.
Figure 8:
Figure 8:

FIG. 8 shows an array status at each phase of the array V10 in the first number placement unit 210.

At first, the first number placement unit 210 substitutes the integer X for an argument Y1 (Step S201).

Next, the first number placement unit 210 makes all of the elements in the array V10 to 0 (an integer P1) (Step S202). The initial array is decided at this point.

Next, the first number placement unit 210 sets the count value $c_1$ of the counter $c_1'$ to 1 (Step S203).

Next, the first number placement unit 210 sets the count value $c_2$ of the counter $c_2'$ to n (Step S204).

Next, the first number placement unit 210 produces a quotient S and a remainder R of the argument Y1 (dividend) divided by the count value $c_2$ (divisor) (Step S205).

Next, the first number placement unit 210 sets the (R+1)th element from left in the elements with 0 in the array V10 to 1 (integer P2) (Step S206).

Next, the first number placement unit 210 substitutes the quotient S for the argument Y1 (Step S207).

Next, the first number placement unit 210 validates if the count value $c_1$=n1 (Step S208). If the count value $c_1$ is not =n1 (No in Step S208), the first number placement unit 210 increments the count value $c_1$ ($c_1 \leftarrow c_1+1$), as the number of the element with 1 in the array V10 has not reached to n1 piece(s). Then, it moves to the process to decrement the count value $c_2$ ($c_2 \leftarrow c_2-1$) (Step S209). Then, the first number placement unit 210 executes the process to get the quotient S and the remainder R of the argument Y1 divided by the count value $c_2$ once again (Step S205).

On the other hand, if the first number placement unit 210 validates that the count value $c_1$=n1 (Yes in Step S208), it outputs the array V10 and the value of the argument Y1 (the integer X1) to the second number placement unit 220 (Step S210), as the number of the elements with 1 in the array V10 has reached to n1 piece(s), and then terminates the process.

In this way, the first number placement unit 210 repeats from the process to get the quotient S and the remainder R until the count value $c_1$ of the counter $c_1'$ becomes n1 (Step S205) to the process to increment the count value $c_1$ and decrement the count value $c_2$ (Step S209). Then, when the count value $c_1$ of the counter $c_1'$ becomes n1, i.e. when the number of 1 among the elements in the array V10 has become n1 piece(s), the first number placement unit 210 outputs the array V10 to the second number placement unit 220.

Actions of the first number placement unit 210 are explained with reference to concrete examples. The explanation is given with an example for a case the integer X actually input is 5644 and the n-dimensional array V10 output by the first number placement unit 210 is, for example, an 8-dimensional array (n=8), having 3 piece(s) (n1=3) of 1 and other 5 piece(s) of 0.

At first, the first number placement unit 210 substitutes 5644 for the argument Y1 (Step S201).

Next, the first number placement unit 210 makes an array status of the array V10 be in an array status having all elements with 0, as shown in the array V11 in FIG. 8 (Step S202).

Next, the first number placement unit 210 makes the count value c1=1(Step S203) and makes the count value c2=8 (Step S204).

Next, the first number placement unit 210 produces the quotient S=705 and the remainder R=4 from the argument Y1=5644 and the count value c2=8 (Step S205).

Next, the first number placement unit 210 sets 1 to the (R+1)th from left in the elements being 0 in the array V10, i.e. the fifth element, V10[5], and be in the array status shown in the array V12 in FIG. 8 (Step S206).

Next, the first number placement unit 210 substitutes 705 (the quotient S) for the argument Y1 (Step S207).

Then, because the count value c1=1 and the count value c1 does not equal 3 (n1) (No in Step S208), the first number placement unit 210 makes the count value c1=2 (increment) and makes the count value c2=7 (decrement) (Step S209).

Next, the first number placement unit 210 produces the quotient S and the remainder R once again from the argument Y1=705 and the count value c2=7 (Step S205). The quotient S is 100 and the remainder S=5.

Next, the first number placement unit 210 sets 1 to the sixth element from left among the elements being 0 in the array V10. An array status of the array V10 before this setup is the array status shown in the array V12 in FIG. 8. The element of 0 in the array V12 is an element other than V12[5]. Because the sixth element in the elements being 0 in the array V12 is V12[7], 0 of V12[7] is made to be 1 (Step S206). Because of this, it becomes the array V13 shown in FIG. 8.

In this way, the first number placement unit 210 makes the element of 0 in the array V10=1 according to the remainder R until the number of the elements having 1 in the array V10 becomes n1 piece(s) (n1=3 in this example). When the number of the element being 1 becomes 3 pieces as shown in the array V14 in FIG. 8, the array is output to the second number placement unit 220 as the array V10.

Next, actions of the second number placement unit 220 are explained.

Figure 9:
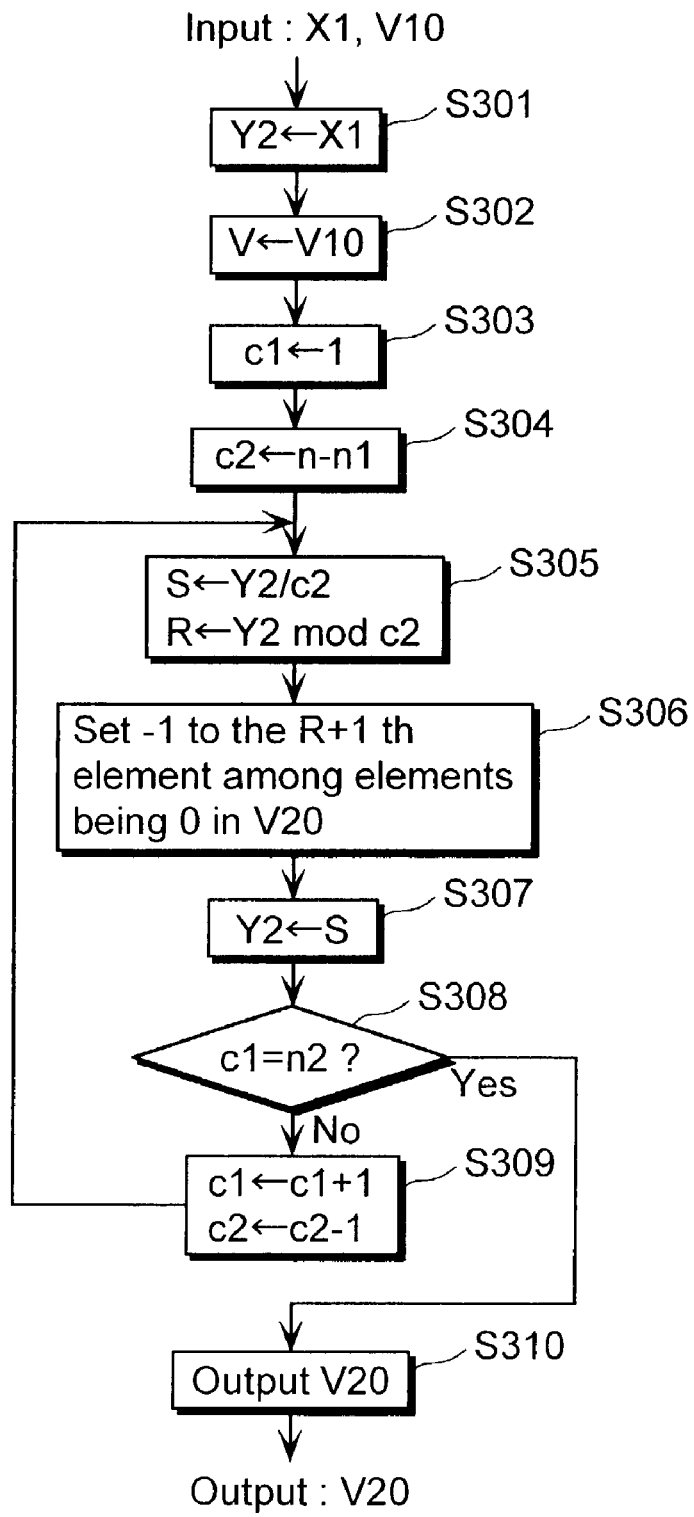
FIG. 9 is a flow chart to show an action of a second number placement unit in the above array output unit.

FIG. 9 is a flow chart to show a process executed by the second number placement unit 220.

Figure 10:
FIG. 10 is a diagram to show an array status of the array output from the second number placement unit in the above array output unit.
Figure 10:

FIG. 10 shows an array status at each phase of the array V20 in the second number placement unit 220.

In the below explanation, suppose the i th element (from left) in the array V20 is V10[i]. Also, suppose the value of the counter c1' is the count value c1, and the value of the counter c2' is the count value c2.

At first, the second number placement unit 220 substitutes the value of the argument Y1 (integer X1) output from the first number placement unit 210 for the argument Y2 (Step S301).

Next, the second number placement unit 220 substitutes the array V10 output from the first number placement unit 210 for the array V20 (Step S302).

Next, the second number placement unit 220 sets the count value c1 to 1 (Step S303).

Next, the second number placement unit 220 sets the count value c2 to (n−n1) (Step S304).

Next, the second number placement unit 220 produces the quotient S and the remainder R of the argument Y2 (dividend) divided by the count value c2 (divisor) (Step S305).

Next, the second number placement unit 220 [sets the (R+1)th element from left element from left to −1,] among the elements being 0 in the array V20 (Step S306).

Next, the second number placement unit 220 substitutes the quotient S for the argument Y2 (Step S307).

Next, the second number placement unit 220 validates whether the count value c1=n2 (Step S308). If the second number placement unit 220 validates the count value c1 is not equal to n2 (No in Step S308), it increments the count value c1 (c1←c1+1) as the number of the element being −1 in the array V20 has not reached n2 piece(s). Then, it moves to the process to decrement the count value c2 (c2←c2−1) (Step S309). Next, the second number placement unit 220 executes the process to produce the quotient S and the remainder R of the argument Y2 divided by the count value c2 once again (Step S305).

On the other hand, if the second number placement unit 220 validates the count value c1=n2 (Yes in Step S308), the array V20 is output (Step S310) because the number of the elements being −1 in the array V20 has reached n2 piece(s), and then the process is terminated.

In this way, the second number placement unit 220 repeats from the process to produce the quotient S and the remainder R (Step S305) until the count value c1=n2, to the process to increment the count value c1 and decrement the count value c2 (Step S309). When the count value c1=n2, the array V20 is output because the number of elements having −1 among the elements in the array V20 has become n2 piece(s) (n2=2 in this example).

Actions of this the second number placement unit 220 are explained with a concrete example. Explanation is given with the following example. The integer X1 actually output from the first number placement unit 210 is 150, and the n-dimensional array V20 output by the second number placement unit 220 is, for example, the 8-dimensional array(n=8), having 3 piece(s) (n1=3) of 1, 2 piece(s) (n2=2) of −1, and the other 3 piece(s) of 0.

At first, the second number placement unit 220 substitutes 150 for the argument Y2 (Step S301).

Next, the second number placement unit 220 substitutes the array V10, having 3 piece(s) of 1 and other 5 piece(s) of 0, output from the first number placement unit 210 for the array V20. The array V21 in FIG. 10 is the array input as a substitute (Step S302).

Next, the second number placement unit 220 makes the count value c1=1 (Step S303) and the count value c2=n−n1 (8−3=5) (Step S304).

Next, the second number placement unit 220 produces the quotient S=30 and the remainder R=0 from the argument Y2=150 and the count value c2=5. (Step S305)

Next, the second number placement unit 220 makes the first element, i.e. V20[1], from left among the elements being 0 in the array V20=−1 (Step S306). The array V22 in FIG. 10 shows this array status.

Next, the second number placement unit 220 makes the argument Y2=30 (the quotient S) (Step S307).

Then, because the count value c1=1 and the count value c1 is not n2 (2) (No in Step S308), the second number placement unit 220 makes the count value c1=2 (increment) and the count value c2=4 (decrement) (Step S309).

Next, the second number placement unit 220 produces the quotient S and the remainder R from the argument Y2=30 and the count value c2=4 once again (Step S305). The quotient S=7 and the remainder R=2.

Next, the second number placement unit 220 sets −1 to the (R+1)th element from left among the elements being 0 in the array V20, i.e. the third element. The array status of the array V20 before the setup is the array V22 shown in FIG. 10, and the element of 0 is V22[3], V22[4], V22[6], V22[8]. Because the third element from left in the elements being 0 in the array V22 is V22[6], 0 of V22[6] is set to be −1 (Step S306).

The array status after this setup is the array V23 shown in FIG. 10.

Next, the second number placement unit 220 substitutes 7 (the quotient S) for the argument Y2 (Step S307).

Then, at this point, because the count value c1=2, i.e. the count value c1=n2 (Yes in Step S308), the second number placement unit 220 outputs the array V20 (Step S310). This array 20 output is in the array status shown in the array V23 in FIG. 10.

In this way, the array output unit 200 outputs the n-dimensional array of having n1 piece(s) of 1, n2 piece(s) of −1, and (n−n1−n2) piece(s) of 0 from the integer X being the hash function value H (m).

The array output unit 200 mentioned above evenly outputs the array L (n, n1, n2) based on the integer X that satisfies $0 \leq X \leq (((n!)/(n-n1-n2)!)-1)$. The following explanation is limited to the integer X that satisfies $0 \leq X \leq (((n!)/(n-n1-n2)!)-1)$.

The first number placement unit 210 sets 1 to the element of the array V10 at the location based on the integer X. The following focuses on the process in detail, which sets this element to 1. Also, in the same way as the first embodiment, in the structure of the first number placement unit 210, the remainder of Step S205 in the count value c2 is R_c2. The overall explanation flow is as follows.

(1) Explain that the replacement process is not duplicated.
(2) Using the result of (1), explain a relationship between a number X and a process content in the array element replacement unit is 1 to 1.
(3) Calculate how many types of the number X that outputs the same array exists.

Regardless of the array, it is possible to indicate the number of types of the integer X is identical in the calculation of (3) so that the output is distributed evenly for the input.

At first, the fact that the placement process is not duplicated is explained.

At first, the following explains the placement of the value (1 or −1) at the same position in the array does not happen at plural times, i.e. once the placement is completed, the position concerned is not regarded as a subject for placement in any subsequent processes.

When the Count Value c2 is n

In Step S206, the R_n+1 th element in the element being 0 in the array V10 is set to 1. Here, when the count value c2 is n, all of elements in V10 are 0 before the R_n+1 th element is set to 1. Therefore, it means that the R_n+1 element is simply set to 1.

When the Count Value c2 is n−1

In Step S206, the R_(n−1)+1 th element in the elements being 0 in the array V10 is set to 1. Because the element being 0 in the array V10 is treated as a subject to be set to 1, note that the R_n th element set at the time the count value c2 is n is not treated as its subject. When the R_(n−1)+1 th element among the elements being 0 in the array V10 is R_(n−1)<R_n, it is simply the R_(n−1)+1 th element in the array V10. In a case of R_(n−1)>R_n, it is the R_(n−1)+2 th element in the array V10.

As mentioned above, the element set to 1 when the count value c2=i is not regarded as a subject to be set to 1 in the step the count value c2 is i+1 and after. Therefore, the element set once is not set again.

After the Process of the First Number Placement Unit 210 is Completed

Therefore, at the point all of the processes are completed when the count value c2 is from n to (n−n1+1), the array V10 has n1 piece(s) of 1 and other (n−n1) piece(s) of 0. The above discussion on the first number placement unit 210 can be applied as well to the second number placement unit 220. At the point when the process of the second number placement unit 220 is completed, the array V20 has n1 piece(s) of 1, n2 piece(s) of −1, and other (n−n1−n2) piece(s) of 0.

A uniqueness of the process for the first number placement unit 210 and the second number placement unit is explained.

Using the above result (placement of the value is not duplicated), the following explains that the relationship between the integer X and the process content in the number placement unit is 1 to 1.

The Relationship Between the Integer X and Series

Suppose the integer X is an integer that satisfies $0 \leq X \leq ((n!)/(n-n1-n2)!)-1)$. At this point, in the same way as the first embodiment, when the count value c2 is i, R of Step S205 in the first number placement unit is supposed to be R_i, and R of Step S305 that executes the same process for the second number placement unit is also R_i. The count value c2 of the first number placement unit 210 here is in a range from n to n−n1+1. The count value c2 of the second number placement unit 220 is in a range from n−n1 to n−n1−n2+1. Therefore, note that the count value c2 is not overlapped between the first number placement unit and the second number placement unit. At this point, the integer X is as follows like the first embodiment.

$$X = (n \times (n-1) \times \ldots \times (n-n1-n2+2)) \times R\_(n-n1-n2+1)$$

$$+ (n \times (n-1) \times \ldots \times (n-n1-n2+3)) \times R\_(n-n1-n2+2)$$

$$\ldots$$

$$+ (n \times (n-1)) \times R\_(n-2)$$

$$+ n \times R\_(n-1)$$

$$+ R\_n$$

Therefore, the integer X has a 1 to 1 relationship with the series R_(n−n1−n2+1), R_n.

Series and Integer Placement

When the counter c2 is i by $R\_i (n-n1-n2+1 \leq i \leq n)$, 1 is set for a case the R'_i+1 th element of the array V20 is $n-n1+1 \leq i \leq n$, and −1 is set for a case the R'_i+1 th element of the array V20 is $n-n1-n2+1 \leq i \leq n-n1$. At that point, including the value of the counter c2 when a sequence, i.e. 1 or −1 is set, the series R_(n−n1−n2+1), . . . , R_n and the above setup have the 1 to 1 relationship.

When the count value c2 is j (j≠i), the R'_i+1 th element is set to y (y is 1 or −1). When the count value c2 is i, the same array V20 is output to set the R'_j+1 th element to y even if a value of the count value c2 is replaced when y is set. There is no case to output the same array V other than this. If the same idea as the first embodiment is applied, this type of value replacement of the count value c2 has (n1)! piece(s) for a case when y=1 and (n2)! piece(s) for a case when y=−1. Therefore, the integer X that outputs the same array V20 has (n1)!×(n2)! types.

The array belongs to L(n, n1, n2) has n!/(n1)!×(n2)!×(n−n1−n2)!) types. Therefore, it is possible for the array output unit 200 in the second embodiment to evenly output n!/((n1)!×(n2)!×(n−n1−n2)!) types of arrays based on n!/(n−n1−n2)! types of the integer X.

Also, from the above explanation, it is obvious that the array output unit 200 always makes the same output for the same input.

The above discussion is for the case of $X<n!/(n-n1-n2)!$. The same discussion may be applied to a case of $X>n!/(n-n1-n2)!$ by taking the remainder of X divided by $(n!/(n-n1-n2)!)$.

A difference in the effect between the first embodiment and the second embodiment is explained here.

In the first embodiment, the count value c of the counter c' may be fluctuated from n to 2. Contrary to that, in the first number placement unit 210 and the second number placement unit 220 of the second embodiment, the count value c2 of the counter c2' is fluctuated from n to (n−n1−n2+1). Therefore, the value of the integer X has n! types in the first embodiment, while it has (n!/(n−n1−n2)!) types in the second embodiment. Therefore, compared with the first embodiment, the input type of the second embodiment can be reduced to (1/(n−n1−n2)!), and a bit length of the required input may be shorter.

A case to use actual parameters is explained. When n=263, n1=16, n2=16, the array belongs to L (n, n1, n2) is $n!/((n1)! \times (n2)! \times (n-n1-n2)!) \approx 2^{163}$. At this time, $n!/(n-n1-n2)! \approx 2^{255}$. In order to retain a well-balanced distribution of the hash function, the hash function requires to have 255 bits or more as its output length. Compared with the first embodiment, the hash function output length required is 1486 bits smaller so that it has better efficiency than the first embodiment.

According to the present embodiment like this, the array output unit 200 can evenly output the n-dimensional array based on the integer X. Therefore, when FOSRT is applied to the NTRU encryption, in stead of the array output unit 100 in the encryption device 10 in FIG. 2 (a), it is possible to retain the well-balanced distribution uniformity of the hash function by using the array output unit 200, and making this array output unit 200 evenly output the n-dimensional array based on the hash function value H (m) output from the hash function unit 40. Consequently, a security level can be improved for the encryption text generated by the encryption device 10.

Furthermore, because the array output unit 200 sets the array V20 only from the information of the integer X, it does not require using a memory table. Hence, it only requires little memory.

Also, instead of the array output unit 105 of the decryption device 15 in FIG. 2 (b), the encrypted text can be decrypted by using this array output unit 200.

In addition, though it has structure to use the array output unit 200 for the encryption device 10 and outputs the array based on the hash function value, it is not limited to this.

The Third Embodiment

Figure 1:
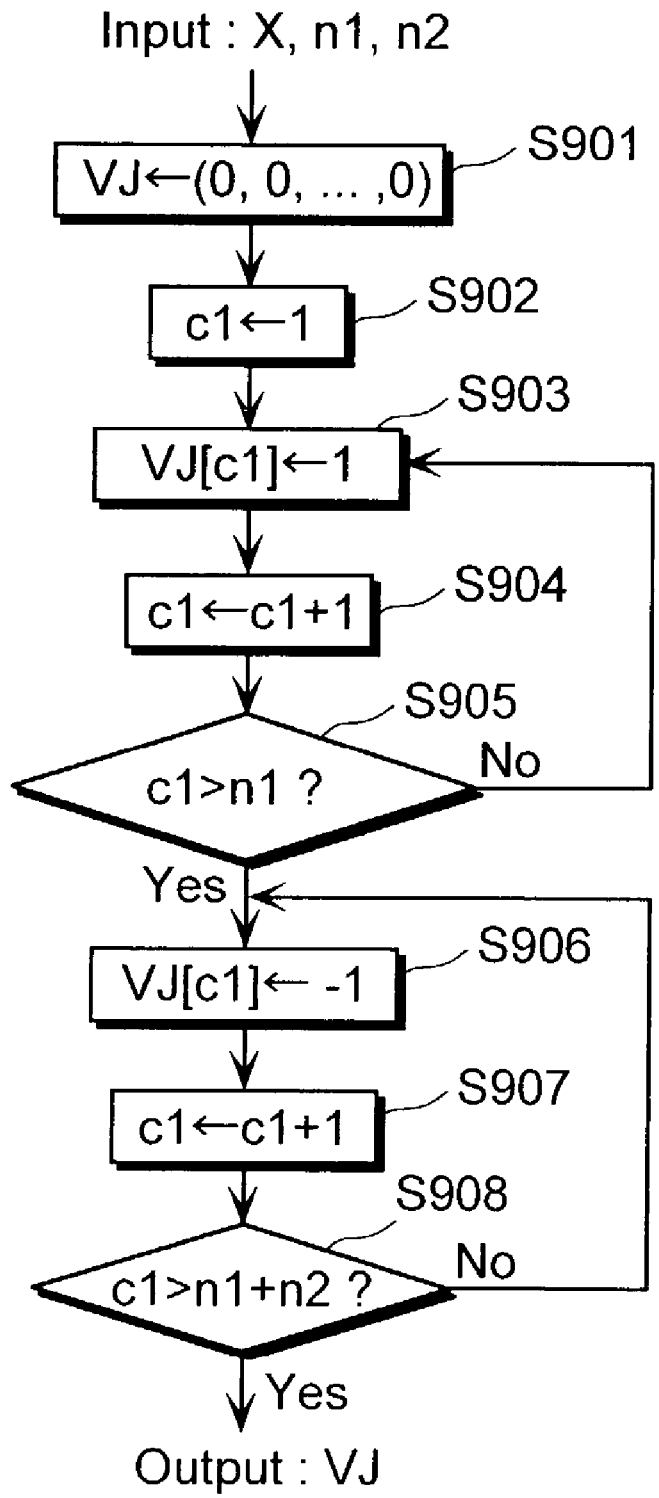
FIG. 1 is a flow chart to show a conventional array output method.

An encryption device related to the third embodiment in the present invention is explained. Compare with the encryption device 10 in FIG. 1, the encryption device of the present embodiment includes an array output unit 300 that has different structure from the array output unit 100. Since other components are identical, their explanation is omitted.

The array output unit 300 in the present invention is explained with reference to diagrams.

Figure 11:
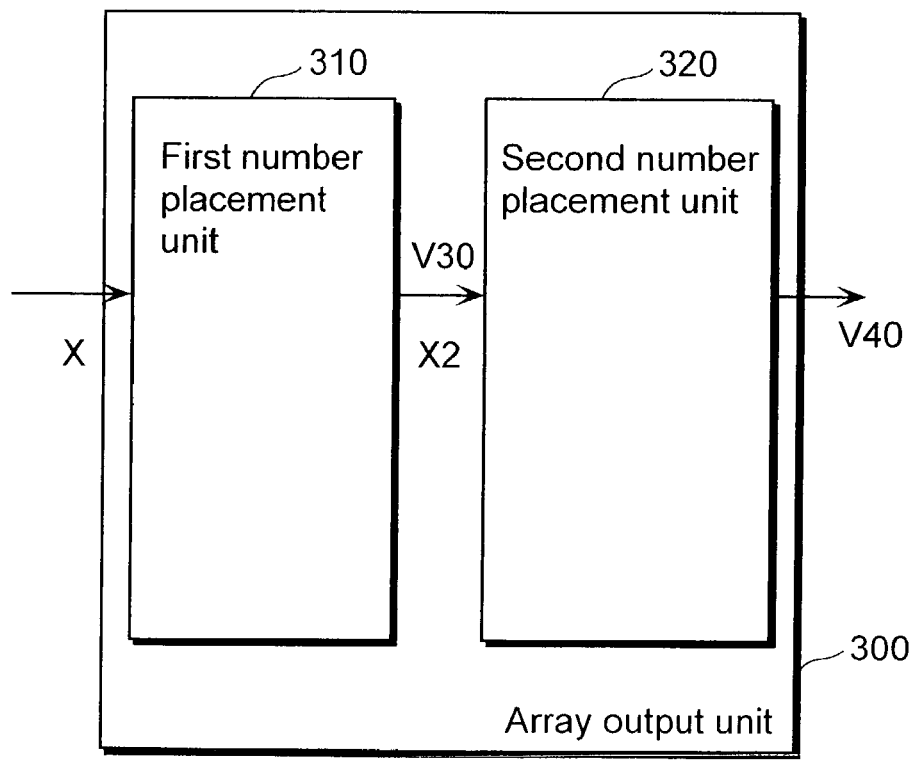
FIG. 11 is a block diagram to show structure of the array output unit related to a third embodiment in the present invention.

FIG. 11 is a block diagram to show structure of the array output unit 300 in the present embodiment.

This array output unit 300 inputs the integer X and outputs the array V40 that belongs to L (n, n1, n2). Here, n, n1 and n2 are preset and provided to this array output unit 300.

The array output unit 300, which consists of a first number placement unit 310 and a second number placement unit 320, executes the process through software of a microcomputer and hardware such as an electric circuit in the same way as the array output unit 100.

The first number placement unit 310 inputs the integer X and outputs the n-dimensional array V30, which has n1 piece(s) of 1, and other elements of 0, and the integer X2 resulted by a specific calculation on the integer X. The first number placement unit 310 tentatively decides the array element having 0 in all of the array elements, and changes the array elements of 0 to 1 based on the integer X.

The second number placement unit 320 inputs the array V30 and the integer X2 output from the first number placement unit 310, and outputs the n-dimensional array V40 having n1 piece(s) of 1, n2 piece(s) of −1, and other n(n−n1−n2) piece(s) of 0. The second number placement unit 320 here changes the array element being 0 in the array output by the first number placement unit 310 to −1.

Actions of the first number placement unit 310 are explained.

Figure 12:
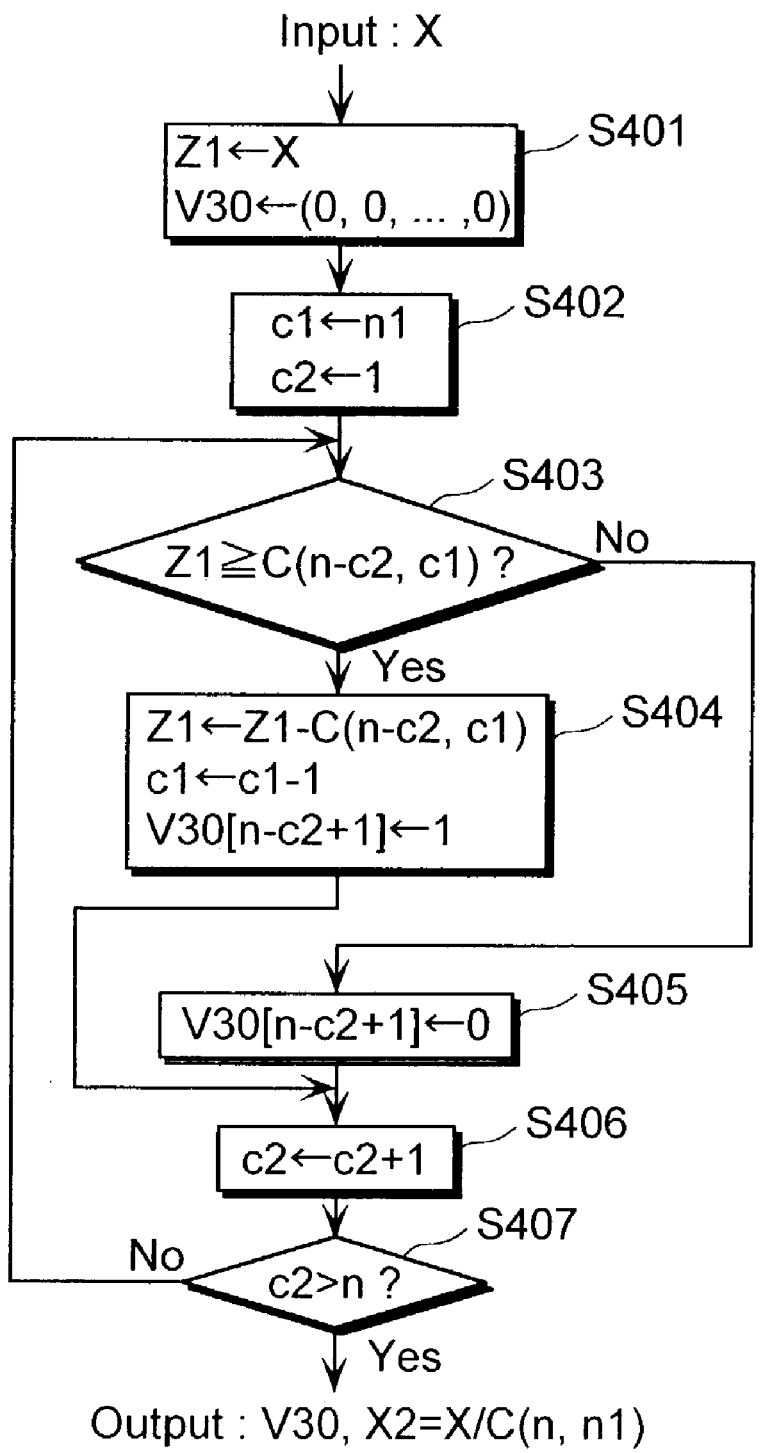
FIG. 12 is a diagram to show an array status of the array output from the first number placement unit in the above array output unit.

FIG. 12 is a flow chart to show the process of the first number placement unit 310. The first number placement unit 310 is executed in the following steps. In the below statement, the i th element (from left) in the array V30 is supposed to be V30[i]. The counter c1' is the count value c1 and the counter c2' is the count value c2. C (s, t) shows the number of combination when t piece(s) are selected from ones of s piece(s). To be specific, $C(s, t)=s!/((s-t)! \times t!)$.

At first, the first number placement unit 310 substitutes the integer X for the argument Z1, and makes the array V30 be the n-dimensional array having all elements with 0 (Step S401). The initial array is decided here.

Next, the first number placement unit 310 sets the count value c1 of the counter c1' to n1, and the count value c2 of the counter c2' to 1 (Step S402).

Next, the first number placement unit 310 validates whether the argument $Z1 \geq C$ (n−c2, c1) (Step S403). When the first number placement unit 310 validates the argument $Z1 \geq C$ (n−c2, c1) (Yes in Step S403), Z1−C (n−c2, c1) is substituted for the argument Z1, the count value c1 of the counter c1' is decremented (c1←c1−1), and the (n−c2+1) th element in the array V30 is set to be 1 (V30[n−c2+1]∴1) (Step S404). Then, the first number placement unit 310 increments the count value c2 of the counter c2' (Step S406).

On the other hand, when the first number placement unit 310 validates the argument Z1 is not $\geq C$ (n−c2,c1) (No in Step S403), the (n−c2+1)th element of the array V30 is set to 0 (V30[n−c2+1]←0) (Step S405). Then, the first number placement unit 310 increments the count value c2 of the counter c2' (Step S406).

In the way like this, according to a size relationship between the argument Z1 and C (n−c2, c1), the (n−c2+1) th element in the array V30 is set to 0 or 1.

Then, when the count value c2 is incremented (Step S406), the first number placement unit 310 validates the count value c2>n (Step S407).

When the first number placement unit 310 validates the count value c2 is not >n (No in Step S407), it executes a validation process once again to validate the argument $Z1 \geq C$ (n−c2, c1) (Step S403), and it repeats from the validation process (Step S403) to the process to validate the count value c2>n (Step S407) until the count value c2 becomes >n.

On the other hand, when the first number placement unit 310 validates the counter c2>n (Yes in Step S407), it outputs the array V30 and X2 (where X2=X/C (n, n1)) to the second number placement unit 320.

Actions of this first number placement unit 310 are explained with a specific example. The explanation is provided with an example having the integer X=50, and the array V30 output by the first number placement unit 310. For example, the 8-dimensional array (n=8) having 4 (n1=4) piece(s) of 1, and other 4 pieces of 0.

FIG. 14 (A) shows an array status of each phase in the array V30.

At first, the first number placement unit 310 substitutes 50 for the argument Z1 (Step S401).

Next, the first number placement unit 310 makes the count value c1 of the counter c1'=4, and the count value c2 of the counter c2'=1 (Step S402).

In this case, since the argument Z1 (50) is ≧C (7, 4) (35) (Yes in Step S403), the first number placement unit 310 makes the argument Z1←50−35=15, the count value c1=3, the eighth element from left in the array V30, V30 [8]=1 (Step S404). The array status of the array V30 at this point is the array V31 shown in FIG. 14 (A).

Next, the first number placement unit 310 increments the count value c2 to 2 (Step S406).

Because the count value c2 is not >8 (No in Step S407), the first number placement unit 310 does not output the array V30 and validates the size relationship of the argument Z1 and C (n−c2, c1) once again (Step S403).

In this case, because the argument Z1 (15) is <C (6, 3) (20) (No in Step S403), the first number placement unit 310 makes the seventh element from left in the array V30, V30[7]=0 (Step S405). The array status of the array V30 at this point is the array V32 indicated in FIG. 14 (A).

In this way, according to the size relationship of the argument Z1 and C (n−c2, c1), 1 or 0 is set sequentially to each element of the array V30. When all of the elements are set, the first number placement unit 310 outputs the array V30 to the second number placement unit 320.

The above process is called as Schalkvijk algorithm. This Schalkvijk algorithm is described in detail in Schalkvijk, "An Algorithm for Source Coding", IT72-18, 1972. (hereinafter this document is referred to as "Literature 4".)

Next, actions of the second number placement unit 320 are explained.

Figure 13:
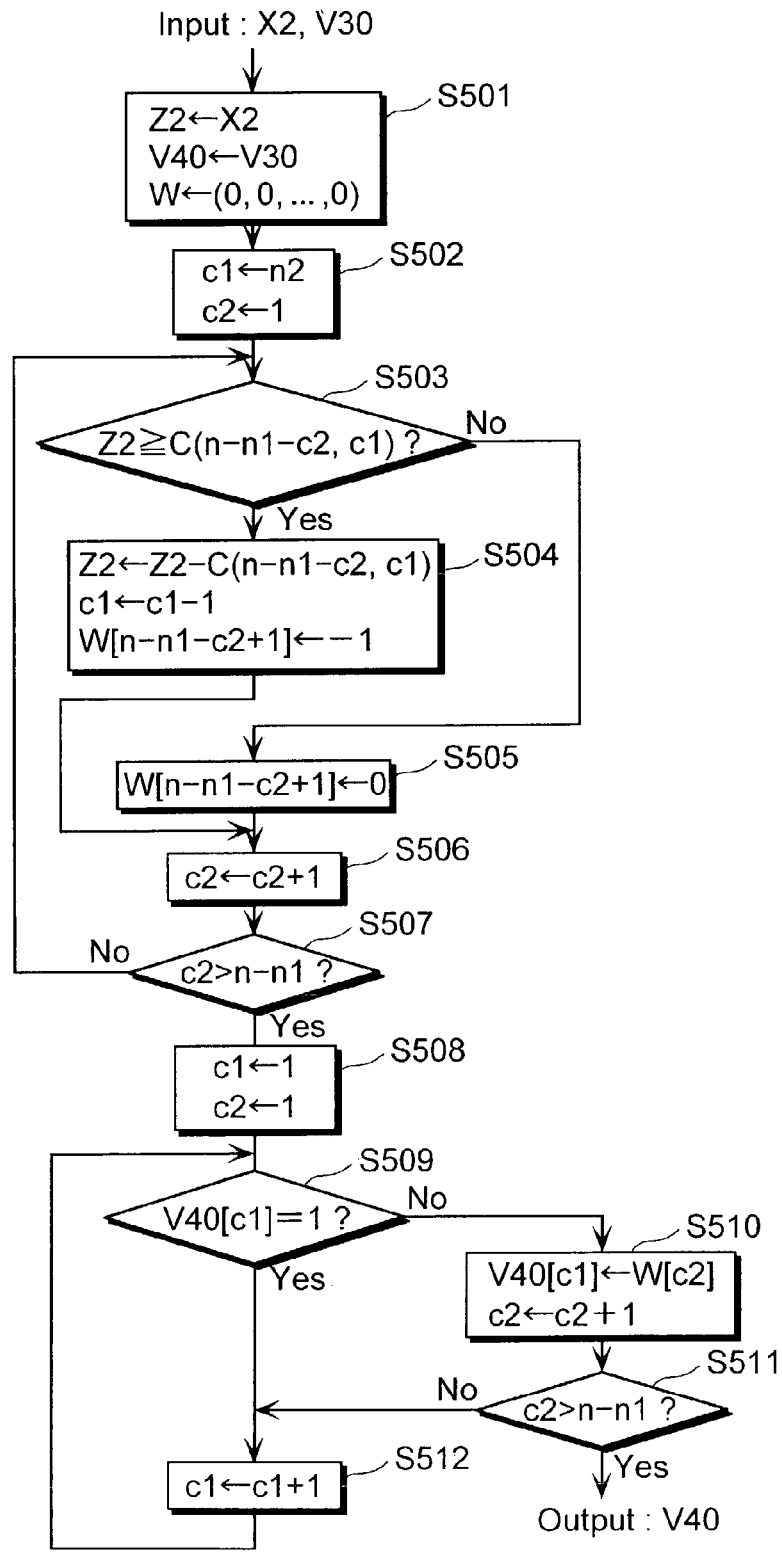
FIG. 13 is a diagram to show an array status of the array output from the second number placement unit in the above array output unit.
Figure 14A:
FIG. 14 A, FIG. 14 B, and FIG. 14 C are diagrams to show an array status of the array set in each unit of the above array output unit.
Figure 14B:
Figure 14B:
Figure 14C:

FIG. 13 is a flow chart to show the process of the second number placement unit 320. The second number placement unit 320 is executed by the following steps.

The following supposes the i th element (from left) in the array V40 is V40 [i]. Also, the value of the counter c1' is the count value c1 and the value of the counter c2' is the count value c2.

At first, the second number placement unit 320 substitutes the integer X2 output from the first number placement unit 310 for the argument Z2, substitutes the array V30 for the array V40, and makes the array W be the (n−n1)th array having all elements with 0 (Step S501).

Next, the second number placement unit 320 makes the count value c1 of the counter c1'=n2 and makes the count value c2 of the counter c2'=1 (Step S502).

Next, the second number placement unit 320 validates if the argument Z2≧C (n−n1−c2, c1) (Step S503). When it validates Z2≧C (n−n1−c2, c1) (Yes in Step 503), Z2−C (n−n1−c2, c1) is substituted for the argument Z2, the count value c1 is decremented (c1←c1−1), the (n−n1−c2+1)th element in the array W is set to −1 (Step S504). Then, the second number placement unit 320 increments the count value c2 (Step S506).

On the other hand, when the second number placement unit 320 validates Z2 is not ≧C (n−n1−c2, c1) (No in Step 503), it makes the (n−n1−c2+1)th element in the array W equal 0 (Step S505). Then, the second number placement unit 320 increments the count value c2 (Step S506).

In the way like this, according to the size relationship between the argument Z2 and C (n−n1−c2, c1), the (n−n1−c2+1)th element in the array W is set to 0 or −1.

Then, when the second number placement unit 320 increments the count value c2 (Step S506), it validates if the count value c2 is c2>n−n1 (Step S507). When the second number placement unit 320 validates that c2 is not >n−n1 (No in Step S507), it executes the validation once again to validate if the argument Z2 is ≧C (n−n1−c2, c1) (Step S503), and repeats from the above process (Step S503) to the process of c2>n−n1 (Step S507) until c2 becomes >n−n1.

In short, the second number placement unit 320 sets the (n−n1−c2+1)th element in the array W to 0 or −1 according to the size relationship between argument Z2 and C (n−n1−c2, c1) for each case the count value c2 is from 1 to (n−n1).

On the other hand, when the second number placement unit 320 validates if c2 is >n−n1 (Yes in Step S507), it moves to the process to make the count value c1 be 1 and the count value c2 be 1 (Step S508).

Next, the second number placement unit 320 validates if the c1 th element in the array V40, V40[c1] is 1 (Step S509). If it validates that V40[c1] is 1 (Yes in Step S509), it increments the count value c1 (c1←c1+1)(Step S512) and executes the above validation process (Step S509).

On the other hand, when the second number placement unit 320 validates V40[c1] is not 1 (No in Step S509), it substitutes the c2 th element in the array W, W [c2] for the c1-th element in the array V40, V40 [c1], and increments the count value c2 (c2←c2+1)(Step S510).

Next, the second number placement unit 320 validates if the count value c2 is c2>n−n1 (Step S511). When the count value c2 is not validated to be c2>n−n1 (No in Step S512), it moves to the process to increment the count value c1 (c1←c1+1) (Step S512).

On the other hand, when the count value c2 is validated to be c2>n−n1, the second number placement unit 320 outputs the array V40 externally and terminates the process.

Here, from the above process to make the count value c1 equal 1 and the count value c2 equal 1 (Step S508) to the process to output the array V40 (until Step S512), the elements of W [c2] are sequentially substituted for the 0 element of V[c1].

These actions of the second number placement unit 320 are explained with a specific example. The explanation is provided with the example that supposes the integer X2 actually input is 20, and the array V40 output by the first number placement unit 320 is, for example, the 8-dimensional array (n=8), having 4 pieces (n1=4) of 1, 2 pieces (n2=2) of −1 and other 2 pieces of 0.

FIG. 14 (B) shows the array status of each phase of the array V40, and FIG. 14 (C) shows the array status at each phase of the array W.

At first, the second number placement unit 320 makes the argument Z2 equal 20, substitutes, for example, the array status shown in the array V41 of FIG. 14 (B) output from the first number placement unit 310 for the array V40, and makes the array W equal (n−n1) dimensional (4-dimensional) array with all elements being 0 (Step S501).

Next, the second number placement unit 320 sets the count value c1 of the counter c1' to 2, and sets the counter c2 to 1 (Step S502).

Next, the second number placement unit 320 validates the size relationship between the argument Z2 and C (n−n1−c2, c1) (Step S503). Because the argument Z2 (20) is ≧C (3, 2) (3) (Yes in Step S503), the second number placement unit 320 makes the argument Z2=17(20−3), the count value c1 equal 1, and the fourth element from left in the array W, i.e.

W[n−n1−c2+1] equal −1 (Step S504). This array status is as shown in the array W1 of FIG. 14 (C).

In the way like this, each element of the array W is set to be 0 or −1. The array W2 in FIG. 14 (C) is one example to show the array status of all elements being set.

Then, when all of the elements in the array W are set (Yes in Step S507), the second number placement unit 320 makes the count value c1 of the counter c1' equal 1 and the count value c2 of the counter c2' equal 1 (Step S508). In a subsequent process, each element in the array W is substituted for the 0 element in the array V41.

At this point, suppose the array status of the array V40 is the array V41 and the array status of the array W is the array W2. At first, since the c1 th element in the array V41, i.e. V41[1] is 0 (No in Step S509), the c2 th element in the array W, i.e. 0 being W[1] is substituted for V41[1]. The array V42 in FIG. 14 (B) is in such a status.

In the way like this, the second number placement unit 320 substitutes all elements in the array W2 for the 0 element in the array V41 (the processes from Step S509 to Step S512), and outputs the array 41. The array V43 in FIG. 14 (B) is the array status when the element of the array 2 is substituted for the 0 element in the array V41.

Entire actions of the array output unit 300 are explained here. At first, the first number placement unit 310 inputs the integer X, and outputs the n-dimensional array V30, which has n1 piece(s) of 1 and other elements of 0, and the integer X2 (where X2=X/C (n, n1)) to the second number placement unit 320.

Next, the second number placement unit 320 inputs the array V30, which is output from the first number placement unit 310, and the integer X2, and outputs the n-dimensional array V40 having n1 piece(s) of 1, n2 piece(s) of −1 and other elements of 0.

The present embodiment puts the Schalkvijk algorithm into practice. To be specific, the Schalkvijk algorithm is used when the placement location is decided for the element of 1 in the array V30 of the first number placement unit 310, and when the placement location is decided for the element of −1 in the array V40 of the second number placement unit 320.

This array output unit 300 converts the integer X, which satisfies $0 \leq X \leq C$ (n, n1)×C(n−n1, n2)(n!/((n1)!×(n2)!×(n−n1−n2)!), to L(n, n1, n2) in a 1 to 1 relationship.

The following explains about the conversion of 1 to 1 relationship, limiting the example to the integer X that satisfies $0 \leq X \leq C$ (n, n1)×C(n−n1, n2).

In the first number placement unit 310 and the second number placement unit 320, the placement location is decided for 1 and −1 by using the Schalkvijk algorithm. If the object is limited to the types of the output for the input or less, it is known that the Schalkvijk algorithm can convert the object in the 1 to 1 relationship. It is described in detail in Literature 4 mentioned above. Therefore, the array output unit 300 in the third embodiment outputs the array V40 that is in the 1 to 1 relationship with the integer X. Consequently, the array output unit 300 is supposed to evenly output the array based on the input integer X.

Here, a difference in the effect between the third embodiment and the first and second embodiments.

In the first embodiment, the value of the integer X for one output value, there are (n1)!×(n2)!×(n−n1−n2)! types as its input value. In the second embodiment, there are (n1)!×(n2)! types. Compared with them, it is converted in the 1 to 1 relationship in the third embodiment. Because of it, it keeps the bit length required for its input to a minimum to retain its uniformity of the input.

The case to use an actual parameter is explained. When n=263, n1=16, n2=16, the array belonging to φ (n, n1, n2) is n!/((n1)!×(n2)!×(n−n1−n2)!)≈2^163. Therefore, the output length of the hash function may just be 163 bits or more, which is 92 bits less than the one required by the second embodiment.

However, C (n−n1, c2) and C (n−n1−n2, c2) need to be calculated in the first number placement unit and the second number placement unit of the array output device 300 in the third embodiment. Since it includes a factorial calculation, the calculation volume becomes bigger. On the other hand, in the first and second embodiment, their calculation volume stays small. Because they do not include the factorial calculation.

In the way like this, according to the present embodiment, the array output unit 300 can evenly output the n-dimensional array based on the integer X. Based on this, FOSRT is applied to the NTRU encryption and the array output unit 300 is used instead of the array output unit 100 of the encryption device 10 in FIG. 2 (A). Therefore, it makes it possible to retain the well-balanced distribution of the hash function by making the array output unit 300 evenly output the n-dimensional array based on the hash function value H (m) output from the hash function unit 40. Consequently, the security level of the encryption text generated by the encryption device 10 can be enhanced.

Additionally, because the array output unit 300 sets the array V40 only from the integer X, it does not require use of a memory table and only requires little memory.

Also, the encrypted text can be decrypted by using the array output unit 300 instead of the array output unit 105 in the decryption device 15 in FIG. 2 (B).

Furthermore, though it has structure to output the array based on the hash function value with using the array output unit 300 in the encryption device 10, it is not limited to this.

The Fourth Embodiment

The encryption device related to the fourth embodiment in the present invention is explained. The encryption device in the present embodiment is composed of the array output unit 400 that has different structure from the array output unit 100 compared with the encryption device 10 in FIG. 2 (A). Because other structure is in common, its explanation is omitted.

The array output unit 400 in the present embodiment is explained with diagrams.

Figure 15:
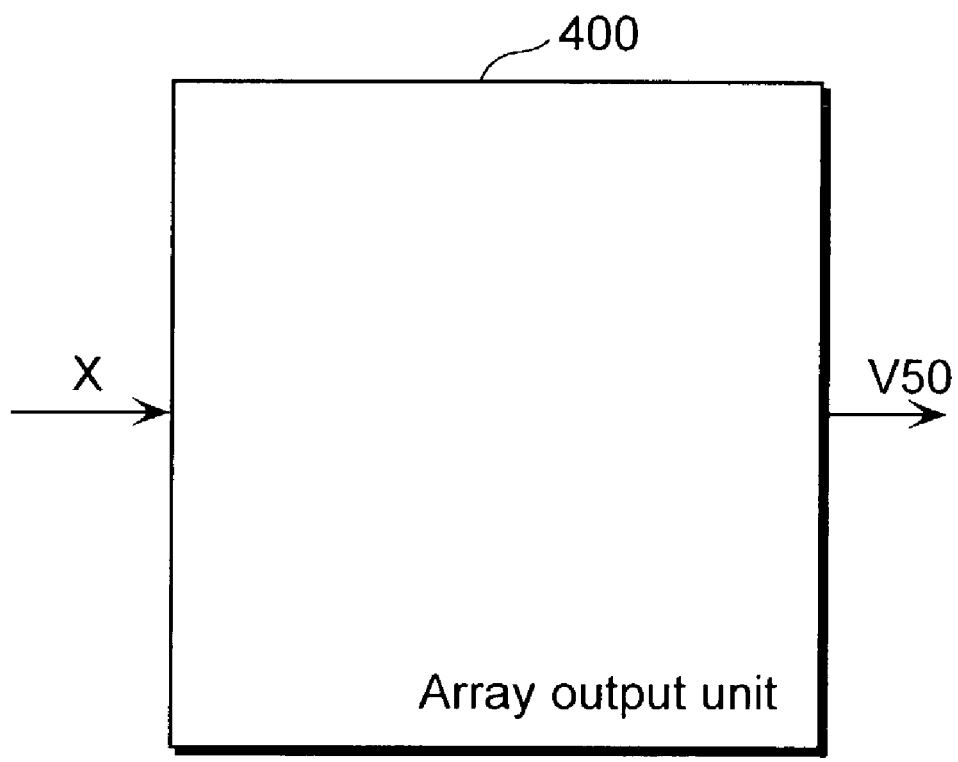
FIG. 15 is a diagram to show structure of the array output unit related to a fourth embodiment.

FIG. 15 is a block diagram to show the structure of the array output unit 400 in the present embodiment.

This array output unit 400 inputs the integer X and outputs the array V50 that belongs to L (n, n1, n2). L (n, n1, n2) here is the entire n-dimensional array having n1 piece(s) of 1, n2 piece(s) of −1 and other (n−n1−n2) piece(s) of 0, and n, n1, n2 are preset in the array output unit 400. This array output unit 400 tentatively decides the array element of which array elements are all 0, and changes the array elements being 0 to 1 and −1 based on the integer X.

The array output unit 400 executes the process through the software of the microcomputer or hardware such as an electric circuit in the same way as the array output unit 100.

Next, actions of the array output unit 400 are explained.

At first, the array output unit 400 makes the array V50 be in the array status having 0 in all elements.

Figures 17, 18:
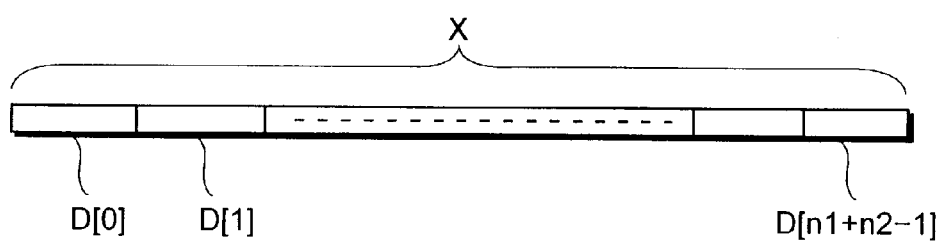
FIG. 17 is a diagram to show a diagram to show an integer input to the above array output unit.
FIG. 18 is a diagram to show an array status of the array output from the above array output unit.

Next, the array output unit 400 divides the integer X by every 8 bits. The integer X is indicated by a set of bit information expressed in 2 values of 0 and 1. As shown in FIG. 17, the integer X is divided into (n1+n2) piece(s) by every 8 bits.

FIG. 17 is a diagram to show the status that the integer X is divided into each split information [0], split information D[1]~split information [n1+n2−1]. Each split information D[0], split information D[1] ~split information D[n1+n2−1] shows an integer of 8 bits information.

Here, if the 8 bits split information D[0] shows the integer Q, the array output unit 400 sets 1 if the Q+1 th (hereinafter referred to as the p0 th) element is 0. Subsequently, the array output unit 400 sets 1 if the p1 th element shown by p1=(p0+D[1]) mod(n) is 0.

In the way like this, the array output unit 400 sequentially sets 1 if the pi th element shown by pi=(P(i−1)+D[i])mod(n) (, i=1~n1+n2−1) in the array V50 based on the split information D[i] is 0. Also, the pi th element in the array V50 refers to the pi th element from the left in the array V50.

At this point, the array output unit 400: does not set 1 if the pi th element in the array V50 is not 0, regards pi←(pi+1)mod(n), and sets 1 to the element of 0, which is located to the right of the pi th element.

As mentioned above, the array output unit 400 executes the process to set the element in the array V50 to 1. When there are n1 piece(s) of 1, the array output unit 400 executes the process to set the −1 element based on the split information D[i] until the number of the −1 element in the array V50 has become n2 piece(s).

Here, actions of the array output unit 400 are explained in detail.

Figure 16:
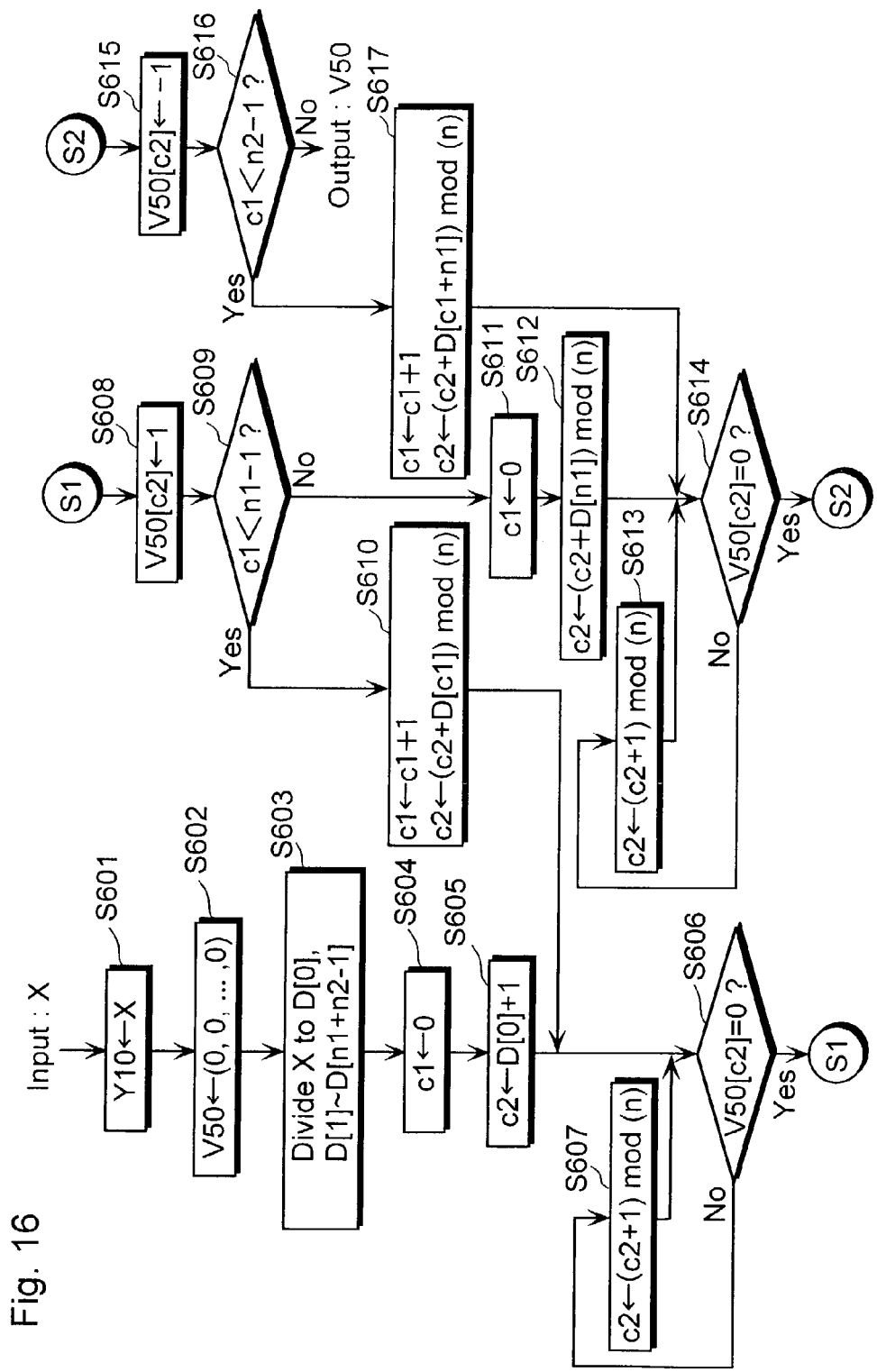
FIG. 16 is a flow chart to show an action of the above array output unit.

FIG. 16 is a flow chart showing the process executed by the array output unit 400. The array output unit 400 is executed through the following steps. The value of the counter c1' is to be the count value c1, and the value of the counter c2' is to be the count value c2.

At first, the array output unit 400 substitutes the integer X for the argument Y10 (Step S601).

Next, the array output unit 400 makes the array V50 be in the array status of having all elements 0 (Step S602).

Next, the array output unit 400 delimits the integer X by every 8 bits, and divides it into the split information D[0], split information D[1]~split information D[n1+n2−1] (Step S603).

Next, the array output unit 400 sets the count value c1" of the counter c1' to 0 (Step S604).

Next, the array output unit 400 sets the count value c2 of the counter c2' to D[0]+1 (Step S605). Consequently, the count value c2 becomes the value of the integer Q+1 shown by the 8-bit split information D[0].

Next, the array output unit 400 validates if the c2 th element V50[c2] in the array V50 is 0 (Step S606). If it is not 0 (No in Step S606), the count value c2 is set to c2←(c2+1)mod(n) (Step S607), and the array output unit 400 determines whether the element V50[c2] is 0 (Step S606). On the other hand, when the array output unit 400 determines that V50[c2] is 0 (Yes in Step S606), the element V50[c2] is set to equal 1 (Step S608).

According to these processes, i.e. the validation process if the element V50[c2] is 0 (Step S606), the process for c2←(c2+1)mod(n) (Step S607) and the process for V50[c2]←1, if the element of V50[c2] is not 0, the 0 element on the right side of V50[c2] is sequentially searched and set to 1.

Then next, the array output unit 400 validates if the count value c1 of the counter c1' is c1<n1−1 (Step S609).

When the array output unit 400 validates that the count value c1 of the counter c1' is c1<n1−1 (Yes in Step S609), it increments the count value c1 (c1←c1+1) as well as making the count value c2 equal c2←(c2+D[c1])mod(n) (Step S610), and validates once again whether V50[c2] is 0 (Step S606).

Consequently, the process is executed to set the element to equal 1 until the number of the 1 element in the array V50 becomes n1 piece(s).

On the other hand, when the array output unit 400 validates that the count value c1 is not c1<n1−1 (No in Step S609), the number of the 1 element in the array V50 is assumed to be n1 piece(s). Therefore, in order to move to the process to set the element to −1 in the array V50, it makes the count value c1 equal 0 (Step S611) and makes the count value c2 equal c2←(c2+D[n1])mod(n) (Step S612).

Next, the array output unit 400 determines whether the element V50[c2] in the array V50 is 0 (Step S614). If it is not 0 (No in Step S614), it makes the count value c2 equals c2←(c2+1) mod(n) (Step S613) and determines whether the element V50[c2] is 0 (Step S614). On the other hand, when the array output unit 400 determines that V50[c2] is 0 (Yes in Step S614), it sets the element V50[c2] to −1 (Step S615).

According to these processes, i.e. the process to determine whether the element V50[c2] is 0 (Step S614), the process for c2←(c2+1)mod(n) (Step S613), and the process for V50[c2]←−1 (Step S615), if the V50[c2] element is not 0, the element to the right of V50[c2] being 0 is sequentially searched and set to −1.

Then next, the array output unit 400 determines whether the count value c1 of the counter c1' is c1<n2−1 (Step S616).

When the array output unit 400 validates that it is c1<n2−1 (Yes in Step 616), it increments the count value c1 (c1←c1+1) as well as making the count value c2 equal c2←(c2+D[c1+n1])mod(n) (Step S617), and determines whether V50[c2] is 0 (Step S614).

On the other hand, when the array output unit 400 determines that c1<n2−1 (No in Step S616), it outputs the array V50 as the number of the −1 element in the array V50 becomes n2 piece(s).

Next, a concrete example is explained along with the flow chart in FIG. 16.

FIG. 18 shows the array status of the array V50 at each phase in the array output unit 400.

The array V50 is the 251-dimensional array (n=251), and n1=50, n2=50. Also, the split information when the integer X is divided by every 8 bits, is for example set to be the split information D[0]=139 and the split information D[1]=130.

According to the present concrete example, the count value c2=D[0]+1=140 in the flow of the flow chart in FIG. 16 (Step S605).

Then, because all of the elements in the array V50 are 0, the 140 th element V50[140] from the left in the array V50 is set to 1 (Step S608). Since this array status is according to the array V51 shown in FIG. 18, in which 140 th element is 1 and other elements are 0.

Next, because the number of the 1 element in the array V50 is not 50 pieces (No in Step S609), the count value c2 is set to equal c2←(c2+D[1])mod(n) (Step S610) in order to execute the process to set the array V50 element to 1. The count value c2=(140+130)mod(251)=19 mod(251), the 19 th element V51[19] from the left in the array V51 is set to equal 1. This array status is as shown in the array V52 of FIG. 18, indicating the 19 th element and 140 th element from the left are 1 and the other elements are 0.

In the way like this, when each element of the array V50 is set to 1, if the element of the position to be set, for example V50[120] has already been 1, the element of its right side is searched round to find the 0 element, and the first 0 element found is set to be 1. Then, if all of the elements up to V50[251] are 0, it moves around and goes back to the leftmost V50[1] and sets the 0 element to 1.

In the same way, the −1 element of the array V50 is set sequentially.

As mentioned above, the array output unit 400 evenly decides the first 1 element in the array V50 based on the split information D[0] found by the integer X. Then, based on the split information D[i] found by the integer X from the first 1 element decided, the location to set the next element is decided in order, the array V50 is evenly distributed from the integer X to set 1 or −1.

At this point, the integer X to be input requires (n1+n2) piece(s) of 8 bit split information in order for the array output unit 400 to decide n1 piece(s) of 1, and n2 piece(s) of −1 in the array V50. Because of that, a big one may be selected for the integer X at a design phase that allows setting each element of the array V50 sufficiently.

In the way like this, according to the present embodiment, the array output unit 400 can evenly output the n-dimensional array based on the integer X. Because of that, in the case FOSRT is applied to the NTRU encryption, this array output unit 400 is used in stead of the array output unit 100 of the encryption device 10 in FIG. 2 (A), and the array output unit 400 evenly outputs the n-dimensional array based on the hash function value H (m) output from the hash function unit 40. Therefore, it makes it possible to retain the well-balanced distribution of the hash function, and enhance the security level of the encryption text generated by the encryption device 10.

Additionally, since the array output unit 400 sets the array V50 only from the integer X, it does not require using a memory table and requires only a little memory.

Also, by using this array output unit 200 instead of the array output unit 105 of the decryption device 15 in FIG. 2 (B), the encrypted text may be decrypted.

Although it has structure that the array output unit 100 is used for the encryption device 10 to output the array based on the hash function value, it is not limited to this.

Figure 19:
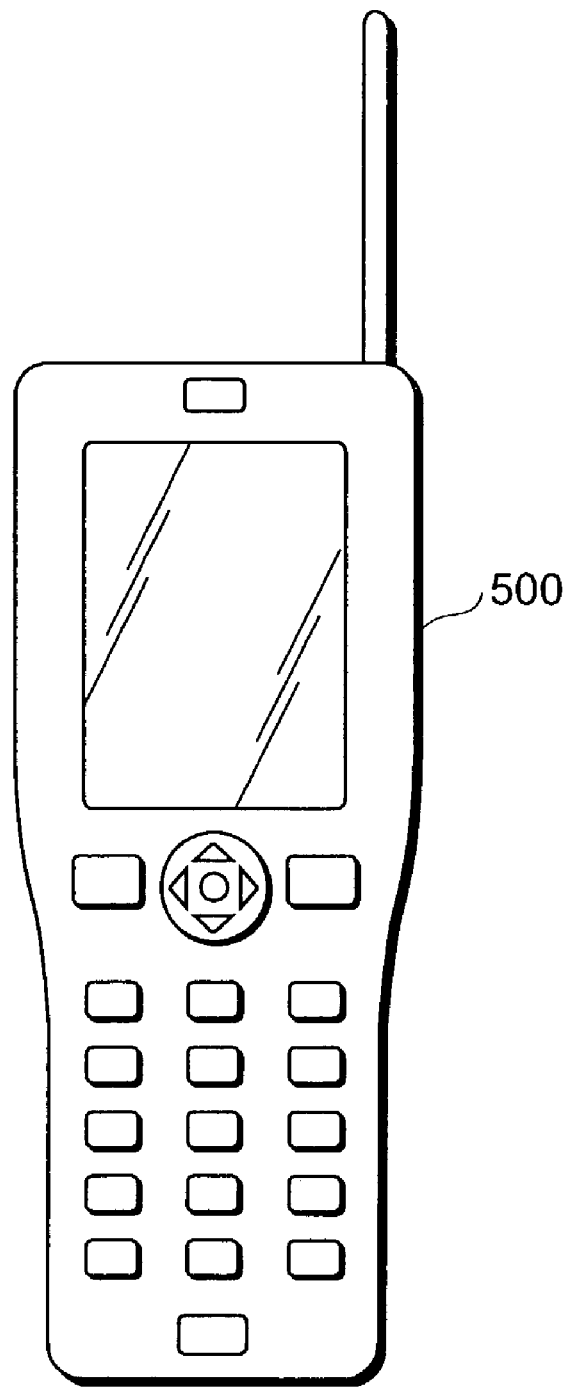
FIG. 19 is an outlook view to show appearance of a mobile phone including the encryption device that contains the array output unit of the present invention.

Also, the encryption device 10 explained in each embodiment may be installed and used in a portable telephone device 500 as shown in FIG. 19, or used for an electric settlement or an electric commerce on the Internet.

Additionally, in each embodiment, 1, 2, 3 and 4, each array output unit outputs the array having n1 piece(s) of 1, n2 piece(s) of −1 and other elements of 0, but 1 and −1 may be the other number. Also, in each embodiment 1, 2, 3 and 4, though each array output unit outputs 3 values of 1, −1, and 0, it may output 2 values, 4 values or more.

Also, it may be an encryption method using one of the embodiments 1, 2, 3, and 4.

As obvious from above explanation, because the numerical array output device that outputs various n-dimensional arrays consisting of n K-value integers, each of which is one of K kinds of integers, depending on an input integer, comprising: an initial array decision unit operable to tentatively decide an initial array; and a changing unit operable to change an array element of the initial array decided by the initial array decision unit into the n-dimensional arrays based on the input integer, it is possible to acquire the n-dimensional array based on the integer such as an output value of the hash function without using so much memory. Therefore, the n-dimensional array, which retains a balance based on the integer values evenly distributed by the hash function, may be acquired.

Also, through the numeral array output device of the present invention, wherein the changing unit includes a division unit operable to divide the input integer by a specific integer and produce a remainder, and a replacement unit operable to replace the array element of the initial array based on the remainder produced by the division unit, the well-balanced n-dimensional array can be acquired based on the integer values evenly distributed by the hash functions, etc., without a use of so much memory.

Additionally, with the numerical array output device, wherein the changing unit includes a division unit operable to divide the input integer by a specific integer and produces a remainder, and an integer placement unit operable to replace the array element, which is located at a position based on the remainder produced by the division unit among the array element of the integer P3 in the initial array, with the integer P1, it is possible to acquire the n-dimensional array that further retains the balance based on the integer values evenly distributed by the hash function without so much memory.

Also, with the encryption device of the present invention that encrypts a message comprising: a function value output unit operable to calculate the message with a one-way converting function and output its result as a function value; a numerical array output unit including an initial array decision unit that tentatively decides an initial array and a changing unit that changes an element of the initial array decided by the initial array decision unit into an n-dimension array based on the function value output by the function value output unit, and operable to output various n-dimensional arrays consisting of n K-value integers, each of which is one of K kinds of integers, depending on the function value; and an encryption text generation unit operable to generate an encryption text based on the array output by the numerical array output unit, it is possible to acquire the well-balanced n-dimensional array based on the integers evenly distributed by the one-way function such as the hash function value of a message, so that a security level of the encryption text may be enhanced.

What is claimed is:

1. An encryption device for encrypting a message, the encryption device comprising:
   a function value output unit operable to calculate a function value of the message according to a one-way converting function and output an input integer which is greater than or equal to 0 and represents the calculated function value;
   a numerical array output unit operable to output a vector of n elements according to the input integer, wherein each of the n elements is selected from K predetermined distinct integer values, said numerical array output unit comprising:
   an initial array selection unit operable to select one vector of n elements as an initial vector; and
   a changing unit operable to change a vector element of the initial vector selected by said initial array selection unit according to the input integer, said changing unit comprising:
   a division unit operable to divide the input integer by a specific positive integer, which is less than or equal to n, to produce a remainder; and
   a replacement unit operable to replace at least one vector element of the initial vector with one of the K predetermined distinct integer values according to the remainder produced by said division unit, wherein
   said division unit and said replacement unit are operable to repeat the division and the replacement, respectively, while changing the specific positive integer value; and an encryption text generation unit operable to generate an encryption text of the message according to a polynomial utilizing the vector of n elements output from said numerical array output unit and a public key.

2. The encryption device according to claim 1, wherein the one-way converting function is a hash function.

3. The encryption device according to claim 1, wherein the K predetermined distinct integer values are P1, P2, . . . , and Pk, said numerical array output unit is operable to output a vector of n elements in which each of n1 elements is an integer P1, each of n2 elements is an integer P2, . . . , and each of nk elements is an integer Pk, where n=n1+n2+ . . . +nk, said initial array selection unit is operable to select, as the initial vector, a predetermined vector in which each of n1 elements is an integer P1, each of n2 elements is an integer P2, . . . , and each of nk elements is an integer Pk, and said replacement unit is operable to replace the at least one vector element of the initial vector with a vector element of the initial vector located at a position corresponding to the remainder.

4. The encryption device according to claim 1, wherein subsequent to the dividing of the input integer by the specific positive integer, said division unit is operable to decrement the specific positive integer by one, subsequently divide a quotient, produced from a previous dividing, by the specific positive integer, to produce a quotient and a remainder, and repeat the decrementing and subsequent dividing until the specific positive integer equals 2, and said replacement unit is operable to repeatedly replace an $n^{th}$ element, corresponding to the specific positive integer, of the initial vector with a vector element of the initial vector located at a position within the initial vector which corresponds to each of the remainders repeatedly produced by said division unit.

5. The encryption device according to claim 1, wherein the K predetermined distinct integer values are P1, P2, . . . , and Pk, said numerical array output unit is operable to output a vector of n elements in which each of n1 elements is an integer P1, each of n2 elements is an integer P2, . . . , and each of nk elements is an integer Pk, where n=n1+n2+ . . . +nk, said initial array selection unit is operable to select, as the initial vector, a vector in which each of n elements is an integer P1, and said replacement unit is operable to replace an integer P1 of the initial vector with one of the integers P2, . . . , and Pk, wherein the integer P1 is located at a position corresponding to the remainder.

6. The encryption device according to claim 5, wherein said division unit is operable to repeatedly, n number of times, divide a quotient, produced from a previous dividing, by the specific positive integer and produce a quotient and a remainder, and said replacement unit is operable to perform the replacement for each of the remainders repeatedly produced by said division unit by replacing the integer P1 of the initial vector n2 times with the integer P2, . . . , and replacing the integer P1 of the initial vector nk times with the integer Pk, wherein each of the integers P1 is located at a position determined according to the remainder.

7. The encryption device according to claim 5, wherein said division unit is operable to subtract from the specific positive integer a value determined according to a number of times for which the dividing is repeated and repeat the subtracting and the dividing, and said replacement unit is operable to perform the replacement for each of the remainders repeatedly produced by said division unit that is equal to or greater than the value that is determined by the number of times for which the dividing is repeated by replacing the integer P1 of the initial vector n2 times with the integer P2, . . . , and replacing the integer P1 of the initial vector nk times with the integer Pk, wherein each of the integers P1 is located at a position determined according to the remainder.

8. The encryption device according to claim 1, wherein said changing unit further comprises a split unit operable to split the input integer into split integers, each of which includes a specific number of bits, said division unit is operable to repeatedly produce remainders by dividing each of the resultant split integers, produced by said split unit, by the specific positive integer, incrementing, by one, each of the split integers, and repeating the dividing and incrementing, and said replacement unit is operable to replace at least one vector element of the initial vector with one of the K predetermined distinct integer values, wherein the at least one vector element is located at a position determined according to at least one of the split integers produced by said split unit and the remainders produced by said division unit.

9. The encryption device according to claim 1, wherein said changing unit further comprises a split unit operable to split the input integer into split integers, each of which includes a specific number of bits, said changing unit is operable to generate an accumulative value by repeatedly adding, one by one, the split integers produced by said split unit, said division unit is operable to repeatedly produce remainders by dividing the accumulative value, generated by said changing unit, by the specific positive integer, incrementing the accumulative value by one, and repeating dividing and incrementing, and said replacement unit is operable to perform the replacement for each of the accumulative values by replacing the integer P1 of the initial vector n2 times with the integer P2, . . . , and operable to replace the integer P1 of the initial vector nk times with the integer Pk, wherein each of the integers P1 is located at a position determined according to one of the new accumulative values and each of the remainders produced by said division unit.

10. The encryption device according to claim 1, wherein K is 3, and the K predetermined distinct integer values are 1, −1, and 0.

11. A program recorded on a recording medium for causing a computer to function as an encryption device for encrypting a message, the program causing the computer to execute a method comprising:

calculating a function value of the message according to a one-way converting function and outputting an input integer which is greater than or equal to 0 and represents the calculated function value;

outputting a vector of n elements according to the input integer, wherein each of the n elements is selected from K predetermined distinct integer values, said outputting of the vector of n elements comprising:

selecting one vector of n elements as an initial vector; and changing a vector element of the initial vector selected by said selecting of one vector of n elements according to the input integer, said changing of the vector element comprising:

dividing the input integer by a specific positive integer, which is less than or equal to n, to produce a remainder;

replacing at least one vector element of the initial vector with one of the K predetermined distinct integer values according to the remainder produced by said dividing of the input integer; and repeating said dividing of the input integer and said replacing of at least one vector element, while changing the specific positive integer value; and generating an encryption text of the message according to a polynomial utilizing the vector of n elements output from said outputting of a vector of n elements and a public key.

12. A decryption device for decrypting an encryption text and outputting an original message, the decryption device comprising:

a decryption unit operable to decrypt the encryption text according to a private key, and output a decryption value which represents the original message;

a function value output unit operable to calculate a function value of the decryption value according to a one-way converting function and output an input integer which is greater than or equal to 0 and represents the calculated function value;

a numerical array output unit operable to output a vector of n elements according to the input integer, wherein each of the n elements is selected from K predetermined distinct integer values, said numerical array output unit comprising:

an initial array selection unit operable to select one vector of n elements as an initial vector; and a changing unit operable to change a vector element of the initial vector selected by said initial array selection unit according to the input integer, said changing unit comprising:

a division unit operable to divide the input integer by a specific positive integer, which is less than or equal to n, to produce a remainder; and a replacement unit operable to replace at least one vector element of the initial vector with one of the K predetermined distinct integer values according to the remainder produced by said division unit, wherein said division unit and said replacement unit are operable to repeat the division and the replacement, respectively, while changing the specific positive integer;

a check-specific text generation unit operable to generate an encrypted check-specific text according to a polynomial utilizing the vector of n elements output from said numerical array output unit and a public key; and an output unit operable to determine whether the encryption text is consistent with the check-specific text, and, if the encryption text is consistent with the check-specific text, operable to subsequently perform a specific process on the decryption value which represents the original message and output the original message.

13. The decryption device according to claim 12, wherein the one-way converting function is a hash function.

* * * * *